US 9,825,700 B2

(12) United States Patent
Ruchet et al.

(10) Patent No.: US 9,825,700 B2
(45) Date of Patent: Nov. 21, 2017

(54) METHOD AND SYSTEM FOR MEASURING AN OPTICAL POWER ATTENUATION VALUE OF A MULTIMODE DEVICE UNDER TEST, RECEIVE DEVICE AND COMPUTER-READABLE MEMORY

(71) Applicant: EXFO INC., Quebec (CA)

(72) Inventors: Bernard Ruchet, Quebec (CA); Gang He, Quebec (CA)

(73) Assignee: EXFO INC., Quebec (CA)

( * ) Notice: Subject to any disclaimer, the term of this patent is extended or adjusted under 35 U.S.C. 154(b) by 0 days.

(21) Appl. No.: 15/220,715

(22) Filed: Jul. 27, 2016

(65) Prior Publication Data
US 2016/0337034 A1    Nov. 17, 2016

Related U.S. Application Data

(63) Continuation-in-part of application No. 14/966,628, filed on Dec. 11, 2015.
(Continued)

(51) Int. Cl.
H04B 10/08    (2006.01)
H04B 10/079   (2013.01)
(Continued)

(52) U.S. Cl.
CPC ....... H04B 10/07955 (2013.01); G01M 11/33 (2013.01); H04B 10/071 (2013.01); H04B 10/2581 (2013.01)

(58) Field of Classification Search
CPC ............ H04B 10/07955; H04B 10/071; H04B 10/2581; G01M 11/33
(Continued)

(56) References Cited

U.S. PATENT DOCUMENTS 4,685,799 A    8/1987  Brininstool
7,724,995 B2 * 5/2010  De Barros ......... G02B 6/02095
                                                        385/28
(Continued)

FOREIGN PATENT DOCUMENTS

GB    2405488 A      3/2005
WO    2014085574 A2  6/2014
WO    2014085574 A3  6/2014

OTHER PUBLICATIONS

Belden Inc. Sending All the Right Signals, "Optical Fiber Loss Testing", 2011, pp. 1-6, U.S.A.
(Continued)

Primary Examiner — M. R. Sedighian
(74) Attorney, Agent, or Firm — Norton Rose Fulbright Canada LLP; Alexandre Daoust

(57) ABSTRACT

There is provided a method for measuring an optical power attenuation value of a multimode DUT. The method generally has, using an optical source, propagating test light along a multimode device link having a first multimode device, the multimode DUT and a second multimode device serially connected to one another; said propagating including inducing a preferential attenuation of high-order optical fiber modes of the test light along the first multimode device and along the second multimode device; using an optical power detector, detecting an optical signal resulting from the propagation of the test light along the multimode device link and transmitting an output signal based on the detected optical signal; and using a processor, determining the optical power attenuation value of the multimode DUT based on the output signal.

20 Claims, 11 Drawing Sheets

Related U.S. Application Data

(60) Provisional application No. 62/108,588, filed on Jan. 28, 2015.

(51) Int. Cl.
*H04B 10/2581* (2013.01)
*H04B 10/071* (2013.01)
*G01M 11/00* (2006.01)

(58) Field of Classification Search
USPC .......................................................... 398/38
See application file for complete search history.

(56) References Cited

U.S. PATENT DOCUMENTS

| | | | | |
|---|---|---|---|---|
| 8,797,642 | B2* | 8/2014 | Chen .................. | G02B 6/03644 359/341.1 |
| 2005/0035279 | A1* | 2/2005 | Matthijsse ........... | G01M 11/088 250/227.16 |
| 2006/0018612 | A1* | 1/2006 | Berkey ................. | G02B 6/024 385/123 |
| 2007/0036493 | A1* | 2/2007 | Brenner ............... | G02B 6/4246 385/89 |
| 2010/0247093 | A1 | 9/2010 | Nakanishi et al. | |
| 2011/0075969 | A1 | 3/2011 | Cline et al. | |
| 2012/0092651 | A1 | 4/2012 | Molin et al. | |
| 2013/0293874 | A1* | 11/2013 | Goldstein ............ | G01M 11/088 356/73.1 |
| 2014/0152979 | A1 | 6/2014 | Flora et al. | |
| 2014/0226151 | A1* | 8/2014 | Bennett ............... | C03B 37/0253 356/73.1 |
| 2016/0202418 | A1* | 7/2016 | Fortin ................. | G02B 6/0281 385/137 |

OTHER PUBLICATIONS

JDS Uniphase Corporation, "Multimode Fiber Characterization Encircled Flux & Launch Condition Considerations", Apr. 2012, JSDU Website, pp. 1-8, U.S.A.

He et al, "Attenuation Measurements of Multimode Fiber: Reconciling the Light Source/Power Meter and OTDR Techniques", 2010, pp. 61-64, Canada.

Telecommunications Industry Association, "Optical Power Loss Measurements of Installed Multimode Fiber Cable Plant; IEC 61280-4-1 Edition 2, Fibre-Optic Communications Subsystem Test Procedure-Part 4-1 : Installed cable plant—Multimode attenuation measurement", Oct. 2010, Virginia, all pages.

The Fiber Optic Association, Inc., "Reference Guide to Fiber Optics Topic : Encircled Flux for Multimode Fiber Meausrements", Jul. 2011, Retrieved from Internet on Mar. 25, 2013.

* cited by examiner

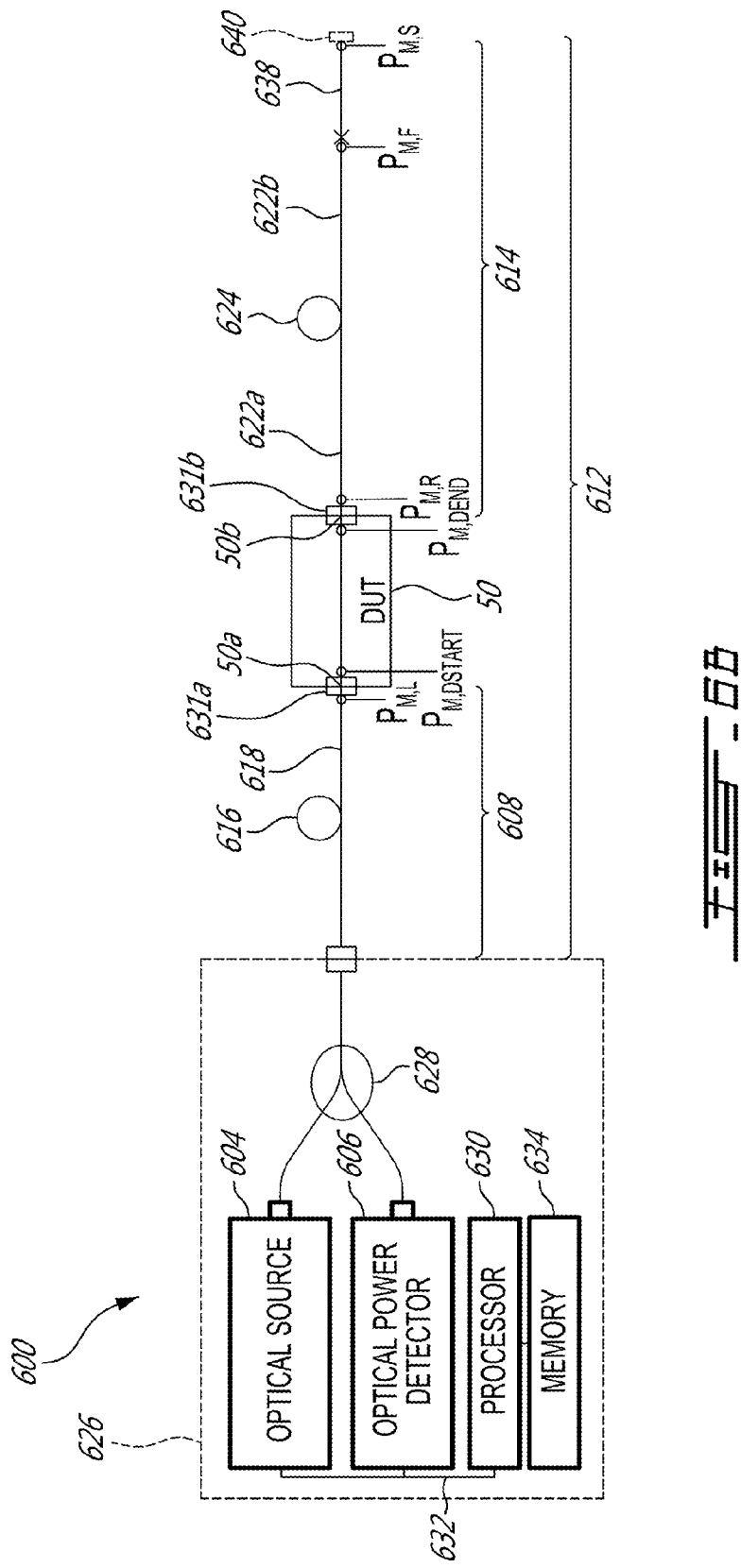

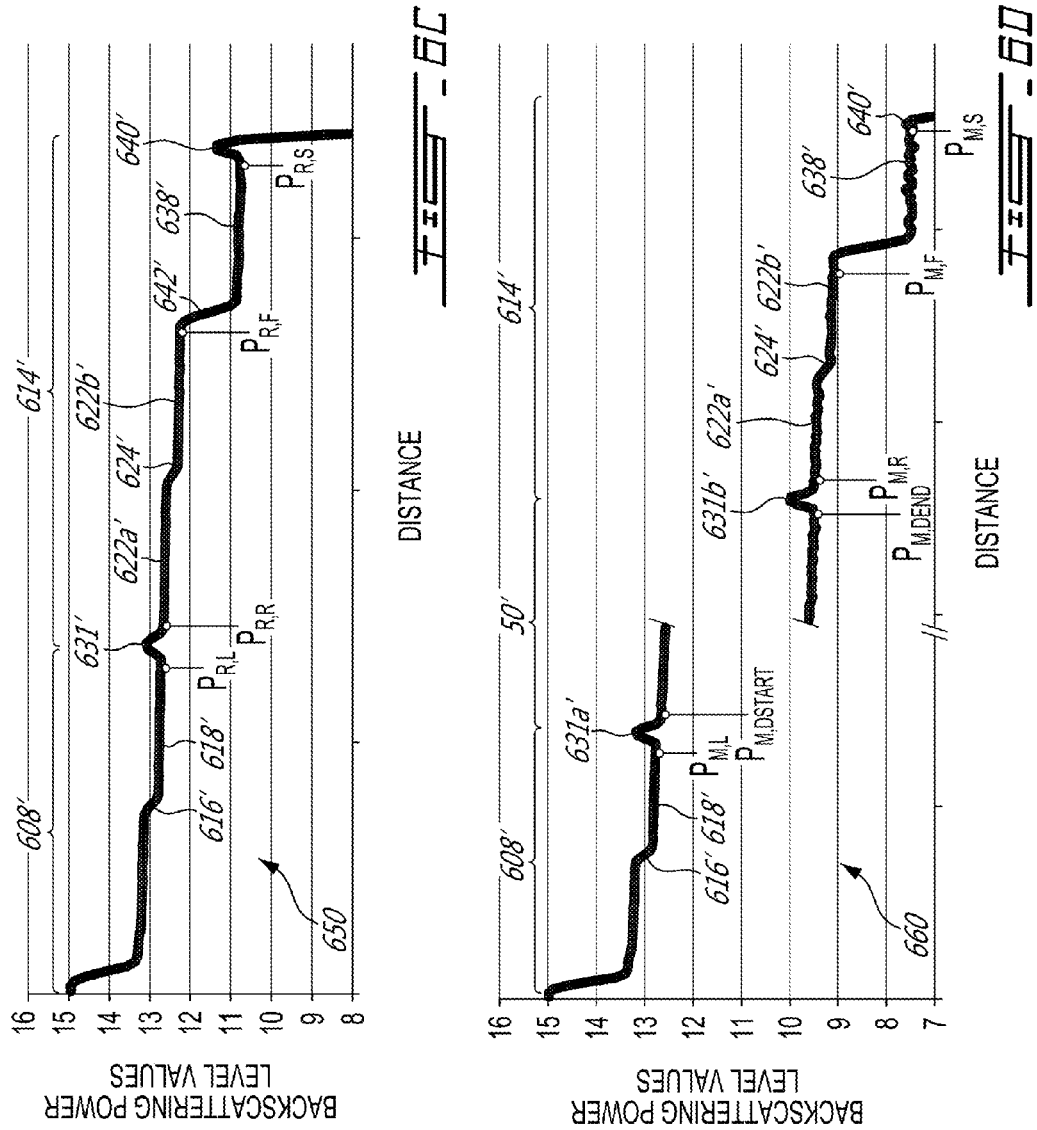

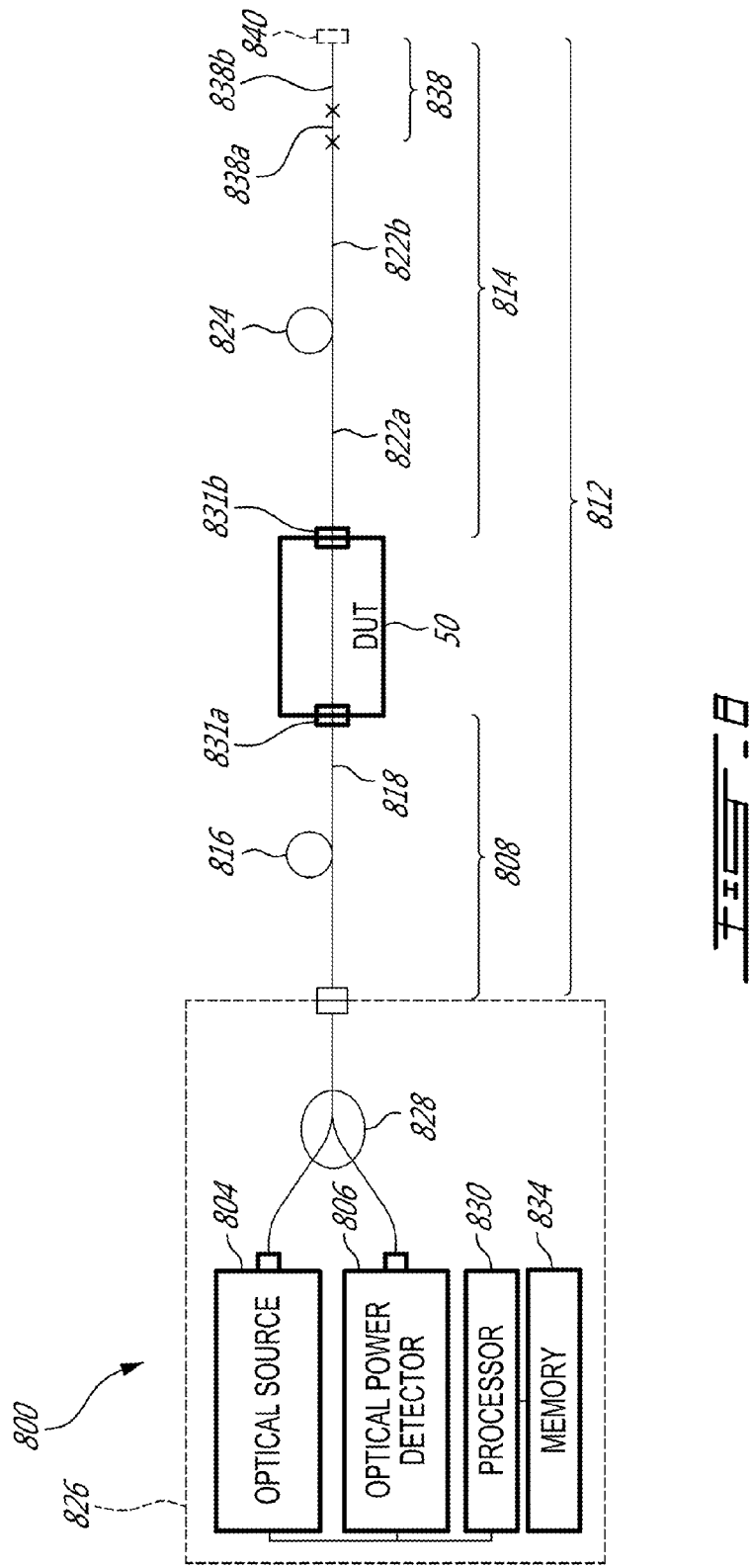

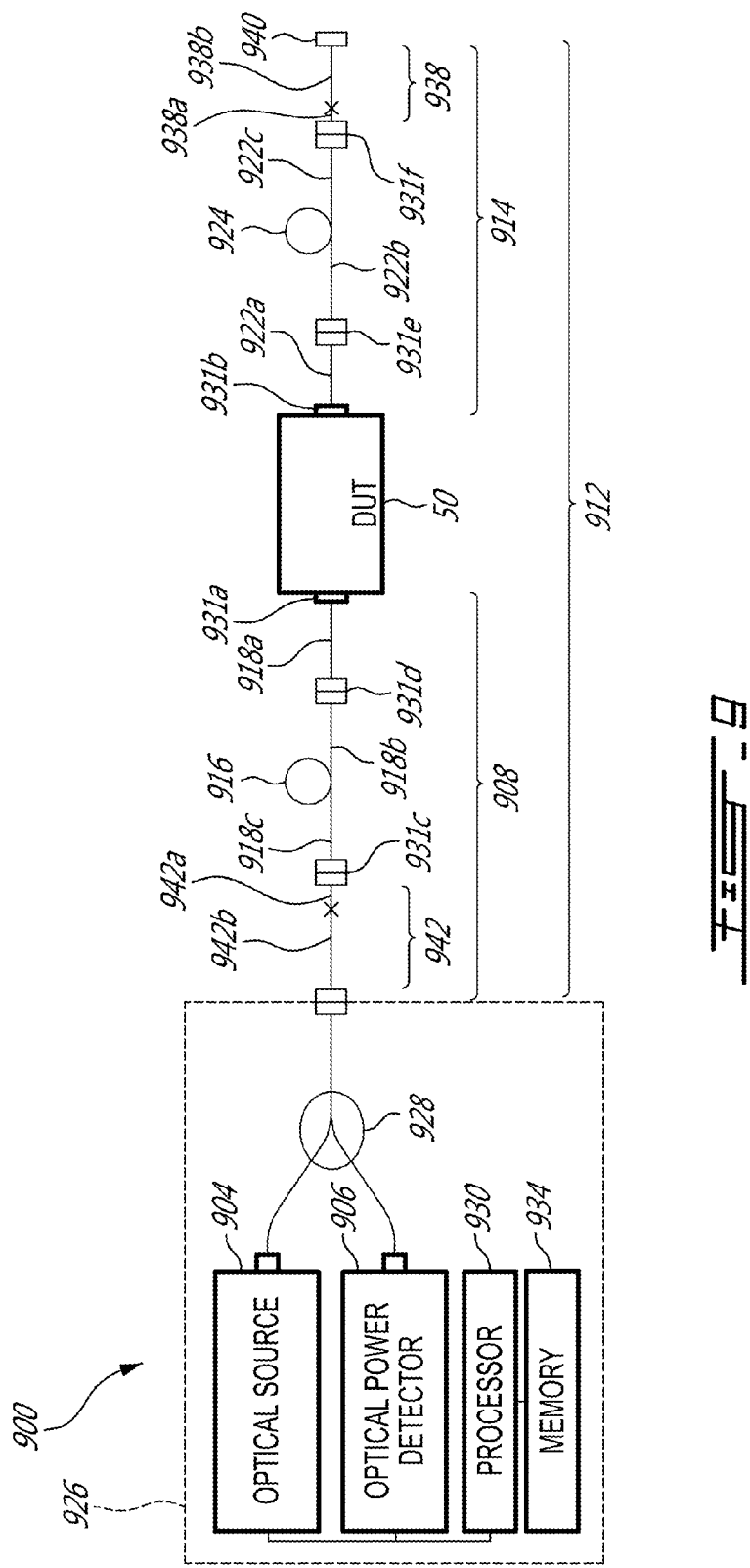

METHOD AND SYSTEM FOR MEASURING AN OPTICAL POWER ATTENUATION VALUE OF A MULTIMODE DEVICE UNDER TEST, RECEIVE DEVICE AND COMPUTER-READABLE MEMORY

REFERENCE TO RELATED APPLICATIONS

This patent application is a continuation-in-part of U.S. patent application Ser. No. 14/966,628, filed on Dec. 11, 2015, now pending, and claims priority of U.S. patent application Ser. No. 14/966,628, filed on Dec. 11, 2015; the specification of which is hereby incorporated by reference. This application also claims priority of U.S. provisional Application Ser. No. 62/108,588, filed on Jan. 28, 2015, the specification of which is hereby incorporated by reference.

FIELD

The improvements generally relate to optical power attenuation measurement in multimode optical fiber links, and more specifically to optical power attenuation measurement using a light-source power-meter approach or an optical reflectometric approach.

BACKGROUND

Optical power attenuation measurement is crucial to proper management of network communication systems. To this end, the Telecommunications Industry Association (TIA) and the International Electrotechnical Commission (IEC) established standard procedures for measuring the optical power attenuation associated with a device under test (DUT) using a light source and a power meter (referred to as the Light-Source Power-Meter (LSPM) approach) or an Optical Time Domain Reflectometry (OTDR) approach.

For the LSPM approach, the IEC 61280-4-1 Standard of the International Electrotechnical Commission (IEC) proposes different procedures for referencing an optical power attenuation measurement (OPLM) system. The referencing and measuring procedures were meant to standardize optical power attenuation measurements associated with a multitude of scenarios that are expected to occur in optical fiber cabling.

EF is a function (EF(r)) defined by international Standards, which characterizes the modal distribution of light in multimode optical fibers. It characterizes the near-field power distribution profile of light exiting (into air) the launch cord. It is defined as that proportion of the total exiting optical power which falls within a circle (i.e. "encircled") of radius r at the end face of the fiber, where r is the radial distance from the optical center of the fiber core. Other methods of characterizing the modal distribution of light also exist.

When performing insertion loss and attenuation measurements of a multimode DUT, whether with the LSPM or the OTDR approach, the modal distribution of the test light must be carefully controlled in order to measure reproducible values of insertion loss or attenuation. If the modal distribution of the test light is not well controlled, "differential mode attenuation" may lead to unrepeatable and irreproducible measurement results.

In order to address this issue, test and measurement international Standards such as the Telecommunication Industry Association (TIA-526-14-B) and the International Electrotechnical Commission (IEC 61280-4-1) define requirements on the modal distribution of test light for performing measurements on multimode DUTs. For example, the IEC 61280-4-1 Standard provides for a target for the encircled flux function, EF(r) characterizing the modal distribution of test light launched into the multimode DUT and defines very tight tolerances on deviations from that target. More specifically, this Standard defines requirements based on lower and upper boundaries of EF values at four or five predefined radial values in the fiber core and for each of the two wavelengths, i.e. 850 and 1300 nm. These requirements apply to both the LSPM and the OTDR approaches.

When light is coupled into a multimode launch cord, depending on the coupling conditions and on the optical power density of the optical source, the coupling may result in light exiting the multimode launch cord being "underfilled" (i.e. too few modes are excited) or "overfilled" (i.e. too many modes are excited). The modal distribution of the test light launched into the multimode DUT need to be adjusted to comply with the EF requirements or any other suitable modal distribution requirement that may be defined by Standards. Various means for controlling the modal distribution of the test light exist in the art including that based on mandrel wrapping, i.e. the tight winding of a multimode optical fiber about a circular mandrel of a given diameter. Mandrel wrapping results in a preferential attenuation of the high-order modes corresponding to an initially overfilled condition. Launch conditions in compliance with a given set of modal distribution requirements (e.g. as defined in the IEC 61280-4-1 Standard) are said to be "mode conditioned".

The Standards thus require the control of the modal distribution of test light launched into a multimode DUT in order to measure the optical power attenuation of the multimode DUT, whether with the LSPM or the OTDR approach. However, there is still room for improvement.

SUMMARY

As per the procedures for LSPM measurement specified in the IEC 61280-4-1 Standard, measurement of the optical power attenuation value of a multimode DUT typically includes conditioning the modal distribution of test light from an optical source and propagating the test light along a launch cord, the multimode DUT and an receive cord serially connected to one another, prior to detection using an optical power detector. A mode conditioner is employed to control the modal distribution of the test light that is propagated into the multimode DUT to satisfy international Standards prior to launching the test light in the multimode DUT. The launch cord and the receive cord are used in accordance with conventional referencing procedures.

In some cases, it may be desired to measure another optical power attenuation value of the same multimode DUT when it is connected in a counter direction. Such measurement includes conditioning the modal distribution of the test light from the optical source and propagating the test light along the launch cord, the multimode DUT but connected in the counter direction (i.e. the multimode DUT is turned around) and the receive cord, prior to detecting, using the optical power detector, an optical signal resulting from the propagation of the test light. However, the two optical power attenuation values of the multimode DUT so measured were found to generally differ from one another due to the asymmetry of the conventional technique. In other words, there is a substantial discrepancy between the two measurements. Therefore, there exists a need in providing an improved method for measuring an optical power attenuation value of a multimode DUT which provides similar optical power attenuation values notwithstanding the direction along which the multimode DUT is measured.

Accordingly, there is provided a method, a system and a receive device for use in measuring optical power attenuation values of the multimode DUT which are at least partially direction independent. Such direction-independence means that two optical power attenuation values measured when the multimode DUT is tested in a first direction and then in a second, counter direction will typically exhibit a difference which is smaller than the discrepancy typically obtained using the conventional technique.

The direction-independence can be achieved by controlling the modal distribution of test light launched into the multimode DUT as well as controlling the modal distribution of the test light at the output of the DUT, i.e. before detection.

As presented herein, the control over the modal distribution of the test light launched into the multimode DUT may be achieved by use of a launch mode conditioner (that can be provided either along a launch device or directly in the optical source device) whereas the control over the modal distribution of the test light at the output of the DUT, i.e. before the optical power detection, may be achieved by use of a receive device having a receive mode filter. The launch mode conditioner has a launch mode filter and may have a mode scrambler. Both the launch mode conditioner and the receive mode filter induce preferential attenuation of high-order optical fiber modes of the test light propagating along corresponding launch and receive devices.

It is envisaged that the improved LSPM approach can involve either large-area detection or fiber-pigtailed detection. In cases where large-area detection is involved, controlling the modal distribution of the receive device may consist of mode filtering only. Alternately, in cases where pigtail detection is involved, any modal distribution sensitivity of the pigtailed optical power detector may be overcome by incorporating a mode scrambler (e.g. a portion of step-index multimode optical fiber) to distribute the optical modes prior to detection using the fiber-pigtailed optical power detector.

As per the IEC 61280-4-1 Standard, measurement of an optical power attenuation value of a multimode DUT using the OTDR approach is conventionally conducted by conditioning the modal distribution of pulsed test light from an optical source and propagating it along a launch cord, the multimode DUT and a receive cord serially connected to one another and detecting and analyzing the return light arising from backscattering and reflections along the test link. Again in this case, a mode conditioner is configured to control the modal distribution of test light to satisfy international Standards prior to launching the test light in the multimode DUT.

It was also found that, in another aspect, measuring an optical power attenuation value of a multimode DUT using an OTDR approach typically yields slightly different results than when using the LSPM approach. There thus exists a need for an improved method of measuring an optical power attenuation value using the OTDR approach which at least partially corresponds to the optical power attenuation value that would be measured using the LSPM approach.

By controlling modal distribution of test light before launch of test light into the multimode DUT and by controlling modal distribution of light returning from the receive cord, the optical power attenuation values measured using the method, system and receive device described herein are at least partially similar to optical power attenuation values that would be measured using the LSPM approach. In this case, controlling the modal distribution of light returning back into the multimode DUT may include both mode filtering and mode scrambling (e.g. using a mandrel concatenated with a portion of a step-index multimode optical fiber).

In accordance with an aspect, there is provided a method for measuring an optical power attenuation value of a multimode DUT, the method comprising: using an optical source, propagating test light along a multimode device link having a first multimode device, the multimode DUT and a second multimode device serially connected to one another; said propagating including inducing a preferential attenuation of high-order optical fiber modes of the test light along the first multimode device and along the second multimode device; using an optical power detector, detecting an optical signal resulting from the propagation of the test light along the multimode device link and transmitting an output signal based on the detected optical signal; and using a processor, determining the optical power attenuation value of the multimode DUT based on the output signal.

In accordance with another aspect, there is provided a system for measuring an optical power attenuation value of light being propagated along a multimode DUT, the system comprising: a first multimode device and a second multimode device having a respective one of a first mode conditioner and a mode filter each being configured to induce a preferential attenuation of high-order optical fiber modes of light; an optical source configured for generating test light to be propagated along a multimode device link including the first multimode device, the multimode DUT and the second multimode device serially connected to one another; an optical power detector connectable to the multimode device link configured for detecting an optical signal resulting from the propagation of the test light and for transmitting an output signal based on the detected optical signal; and a processor configured for determining the optical power attenuation value based on the output signal.

In accordance with another aspect, there is provided a receive device for use in measuring an optical power attenuation value of a multimode DUT using a reflectometric method, the receive device comprising: a first portion of gradient-index multimode optical fiber; a mode filter having an end connected to the first portion of gradient-index multimode optical fiber, the mode filter inducing a preferential attenuation of high-order optical fiber modes of light being propagated along the mode filter; a second portion of gradient-index multimode optical fiber connected to another end of the mode filter; and a mode scrambler connected to the second portion of gradient-index multimode optical fiber for distributing optical fiber modes of light being propagated along the mode scrambler.

In accordance with another aspect, there is provided a non-transitory computer readable memory having recorded thereon instruction code for execution by a processor for use with an optical time-domain reflectometer including an optical source and an optical power detector, said instruction code comprising: code for obtaining an output signal based on an optical signal resulting from the propagation of test light along a multimode device link including a launch device, a multimode DUT and the receive device of claim 18 serially connected to one another; code for determining at least one optical power attenuation value of the multimode DUT based on the output signal, at least one of the at least one optical power attenuation value being equivalent to an optical power attenuation value of the multimode DUT as would be measured using a light-source power meter approach; and code for displaying the at least one optical power attenuation value of the multimode DUT.

Many further features and combinations thereof concerning the present improvements will appear to those skilled in the art following a reading of the instant disclosure.

DESCRIPTION OF THE FIGURES

In the figures,

FIG. 6B is a schematic view of the other example of the system of FIG. 6A, shown in a measuring step;

FIG. 6C is a graph of an example of an experimental OTDR reference trace obtained in the referencing step shown in FIG. 6A;

FIG. 6D is a graph of an example of an experimental OTDR measurement trace obtained in the measuring step shown in FIG. 6B;

FIG. 8 is a schematic view of another example of a system for measuring an optical power attenuation value of a multimode DUT in an OTDR approach, showing a receive device with an example returning light device, exemplary of an embodiment; and FIG. 9 is a schematic view of another example of a system for measuring an optical power attenuation value of a multimode DUT in an OTDR approach, showing both a launch device and a receive device with an example returning light device, exemplary of an embodiment.

DETAILED DESCRIPTION

Figure 1:
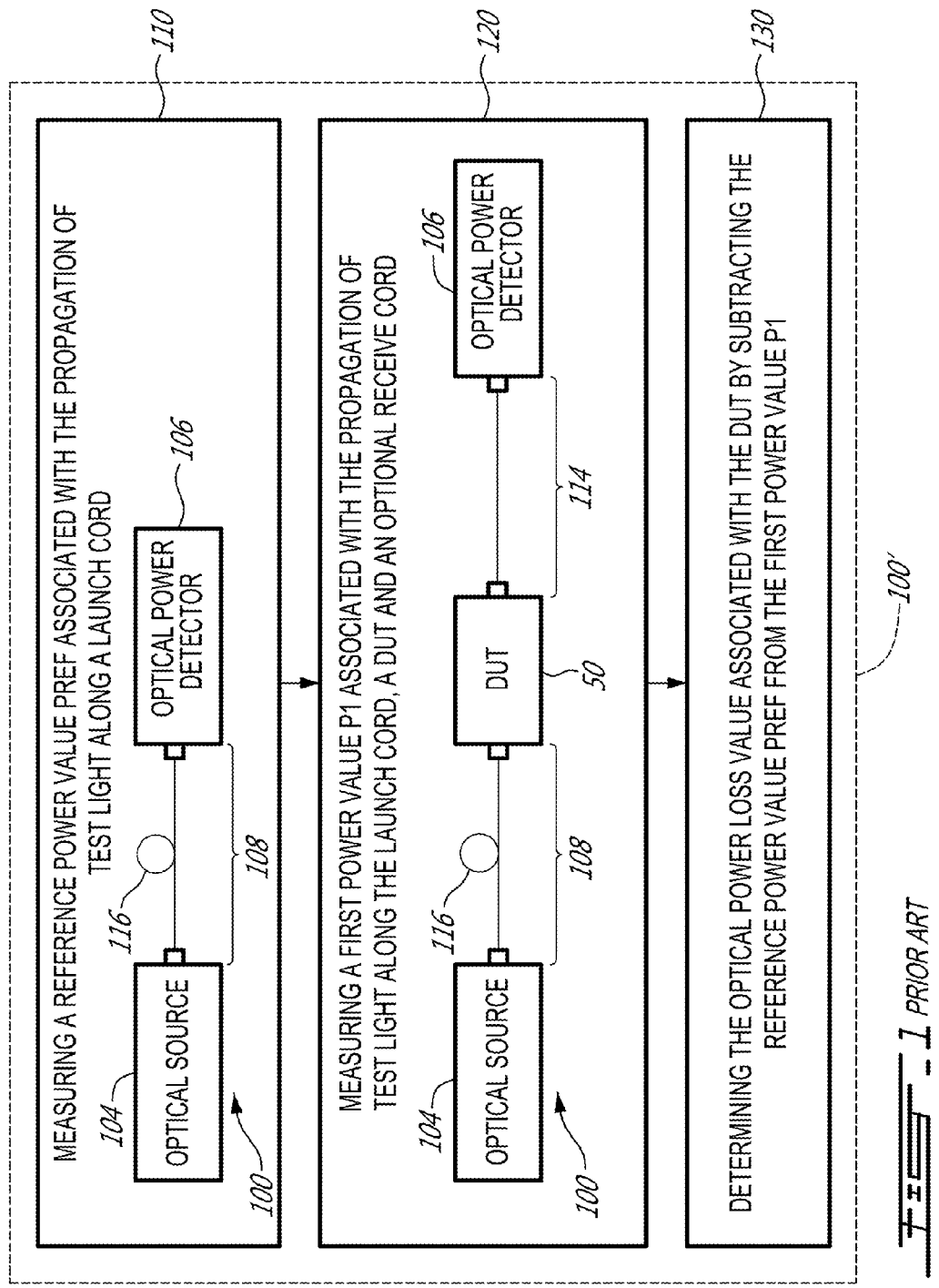
FIG. 1 is an exemplary flowchart associated with a one-cord reference procedure using a conventional system, in accordance with the prior art.

Now referring to the drawings, FIG. 1 shows a flowchart of a method 100' of determining an optical power attenuation value of a DUT 50 using a conventional system 100. The conventional system 100 has an optical source 104, an optical power detector 106 and a launch cord 108 having a launch mode conditioner 116, in accordance with the conventional one-cord reference procedure. The launch mode conditioner 116 has a launch mode filter and may optionally have a mode scrambler. Briefly described, the method 100' has a step 110 of measuring a reference power value Pref associated with the propagation of test light along the launch cord 108. The test light propagated at the end of the launch cord 108 has a given modal distribution due to the launch mode conditioner 116. The method 100' has a step 120 of measuring a first power value P1 associated with the propagation of test light along the launch cord 108, the DUT 50 and a receive cord 114. The test light propagated into the DUT 50 at the end of the launch cord 108 has the same given modal distribution due to the launch mode conditioner 116. The method 100' has a step 130 of determining the optical power attenuation value associated with the DUT 50 by subtracting the first power value P1 from the reference power value Pref.

Figure 2:
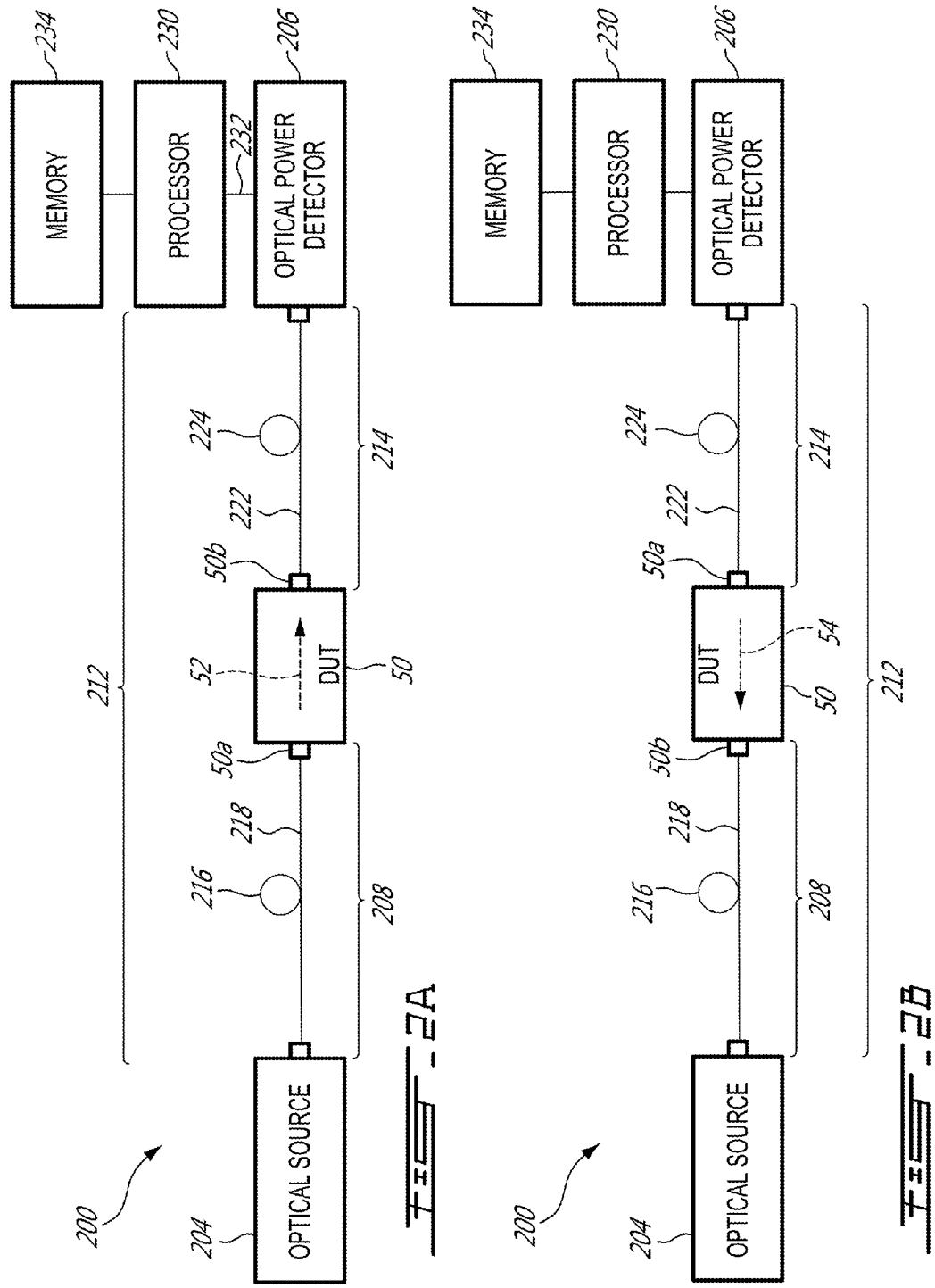
FIG. 2A is a schematic view of an example of a system for measuring an optical power attenuation value of a multimode DUT in an LSPM approach when the multimode DUT is in a first direction, exemplary of an embodiment.
FIG. 2B is a schematic view of the system shown in FIG. 2A with the multimode DUT connected in a second direction, exemplary of an embodiment.

FIGS. 2A-B show an example of a system 200 for measuring an optical power attenuation value of a multimode DUT 50, in accordance with the improved LSPM approach. During use, the system 200 has an optical source 204 and an optical power detector which are connected to opposite ends of a multimode device link 212, and a processor 230 in communication with at least the optical power detector 206. The optical power detector 206 may either be a large-area detector or a fiber-pigtailed detector.

As depicted, the multimode device link 212 has a first multimode device (referred to as "launch device 208"), the multimode DUT 50 and a second multimode device (referred to as "receive device 214") respectively connected in series to one another. For ease of understanding, the skilled reader will appreciate that the launch and receive devices 208 and 214 are to be used in a manner similar than the conventional launch and receive cords 108 and 114 (shown in FIG. 1) employed in the conventional one-cord reference, or the conventional launch and receive cords employed in the conventional two- or three-cord reference as described in the IEC 61280-4-1 Standard. Of course, the launch and receive devices 108 and 114 may be used as well in any variation of the one-, two- or three-cord reference that may be envisaged. The launch device 208 and the receive device 214 may each include one or more portions of a multimode optical fiber and one or more optical multimode components serially connected to one another.

For clarity, FIG. 2A shows the multimode DUT 50 in a first direction 52 whereas FIG. 2B shows the multimode DUT 50 being turned around in a second direction 54. More specifically, when connected in the first direction 52, the multimode DUT 50 has a first end 50a connected toward the launch device 208 and a second end 50b connected toward the receive device 214. As shown in FIG. 2B, when the multimode DUT 50 is connected in the second direction 54, the DUT 50 has the first end 50a connected toward the receive device 214 and the second end 50b connected toward the launch device 208.

Figure 3:
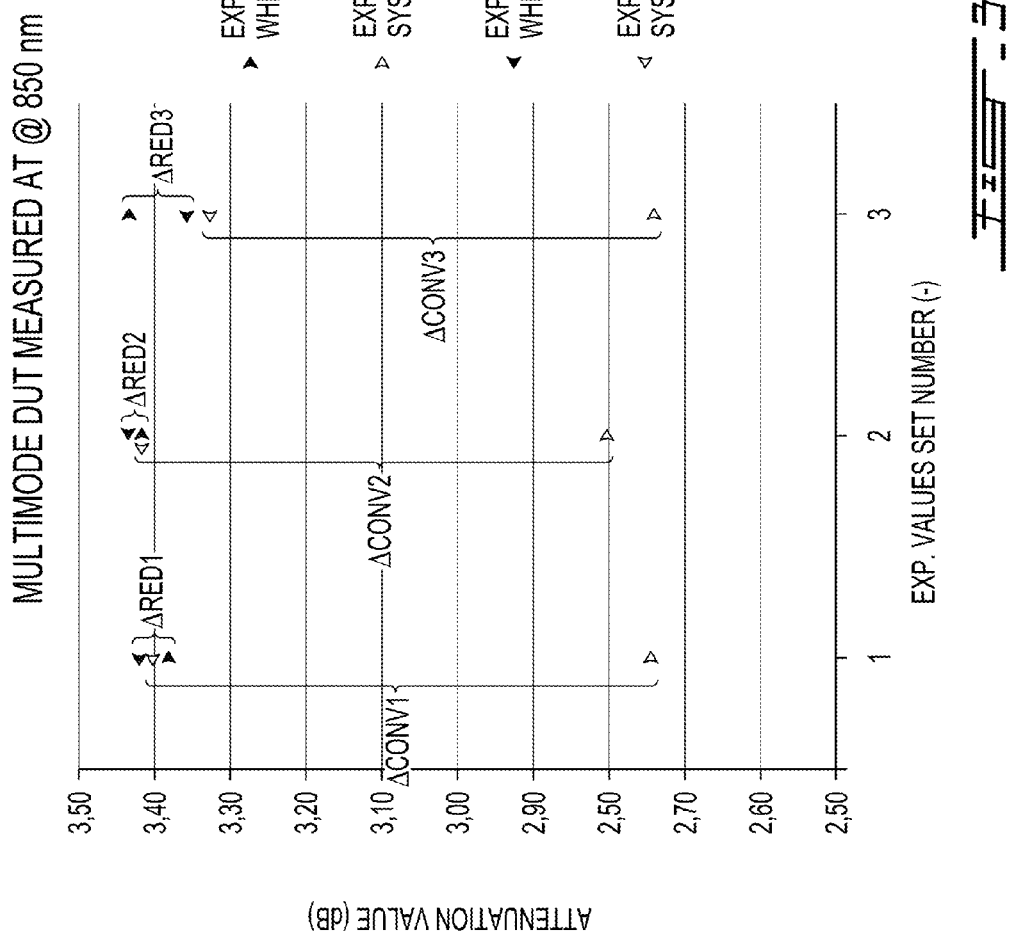
FIG. 3 is an example of a graph showing three sets of experimental optical power attenuation values, wherein each set includes experimental optical power attenuation values when the multimode DUT is connected in a first direction and in a second direction and taken using the conventional system shown in FIG. 1 and the system shown in FIGS. 2A-B.

Broadly described, the launch and receive devices 208 and 214 shown in FIGS. 2A-B are configured to control both the modal distribution of test light before launch of test light into the multimode DUT 50 and the modal distribution of light propagated out of the multimode DUT 50, before detection of the received optical signal using the optical power detector 206. The received optical signal results from the propagation of the test light along the multimode device link 212. By doing so, the optical power attenuation values measured using the system 200 shown in FIGS. 2A-B can be said to be direction-independent, which is not the case for optical power attenuation values measured using the conventional system 100. Indeed, when using the conventional system 100, it was found that a measurement conducted in one direction of the multimode DUT 50 yields an optical power attenuation value that may substantially differ from that obtained when turning the multimode DUT 50 around to conduct a measurement in the other direction. For instance, FIG. 3 is a graph showing three sets of experimental optical power attenuation values (see measurement number 1, 2 and 3) on a same multimode DUT. Each set of experimental data includes a first pair of experimental optical power attenuation values (see grey arrows) measured using the conventional system 100 and a second pair experimental optical power attenuation values measured using the system 200 (see black arrows). The first and second pairs each includes one measurement when the multimode DUT 50 is connected in the first direction 52 and another measurement when the multimode DUT 50 is connected in the second direction 54. As can be noticed, the first pairs of experimental values differ by variations Δconv1, Δconv2 and Δconv3. These variations are of the order of about 0.5 to 0.65 dB in this example. In contrast, the second pairs of experimental values differ only by reduced variations Δred1, Δred2 and Δred3. The reduced variations are of the order of about 0.05-0.10 dB in this example.

The distribution of the experimental values of the second pairs of experimental values shown in FIG. 3 shows that more tightly distributed results are obtained when using the conventional system 100 to measure optical power attenuation values of multimode DUTs in both its direction in the system 200.

The launch and receive devices 208 and 214, respectively, are configured to allow proper referencing (e.g. using the one-, two- and/or three-cord reference procedure). More specifically, the launch device 208 conceptually has a launch mode conditioner 216 and a launch cord 218, and the receive device 214 conceptually has a receive cord 222 and a receive mode filter 224. As depicted in FIGS. 2A-B, the launch mode conditioner 216 and the launch cord 218 of the launch device 208 are part of a single continuous portion of waveguide (e.g. a continuous portion of a multimode optical fiber). The receive device 214 can also be provided in the form of a continuous portion of a multimode optical fiber.

In a further embodiment (not illustrated), the launch mode conditioner 216 is provided inside the optical source 204 such that the launch device 208 is made only when the launch cord 218 is connected to the optical source 204, or more specifically, to the launch mode conditioner 216 that is provided inside the optical source 204. In any case, the launch device 208 is said to incorporate the launch mode conditioner 216 and the launch cord 218 during use of the system 200. Similarly, in an embodiment, the receive mode filter 224 is provided inside the optical power detector 206 such that the receive device 214 is made only when the receive device 214 is connected to the receive mode filter 224 that is provided inside the optical power detector 206. In another embodiment, the launch mode conditioner 216 is connected to the launch cord 218 via an optical connection (e.g. a splice or end connectors). The receive cord 222 and the receive mode filter 224 can also be connected via an optical connection. In the example provided in FIGS. 2A-B, any multimode optical fiber that is not specifically identified as a multimode step-index optical fiber (including that of the launch mode conditioner 216, the launch cord 218, the receive cord 222 and the receive mode filter 224) can be gradient-index multimode optical fibers.

The launch mode conditioner 216 of the launch device 208 and the receive mode filter 224 of the receive device 214 are each configured to induce a preferential attenuation of high-order optical fiber modes of light (simply referred to as "preferential attenuation of light") propagating along the multimode device link 212. In an embodiment, the preferential attenuation of light is in compliance with the launch conditions requirements as defined in the IEC 61280-4-1 International Standard. However, the preferential attenuation of light may not be limited to the IEC 61280-4-1 or IEC 60793-2-10 international Standards. For instance, the preferential attenuation and the launch conditions may be in compliance with any other relevant Standard or otherwise-defined requirements or recommendations. The launch mode conditioner 216 and the receive mode filter 224 may each be provided in the form of a portion of optical fiber wrapped around a circular mandrel having a diameter adapted for inducing the preferential attenuation of light. In an embodiment, the circular mandrel may have an adjustable loop for adjusting the preferential attenuation. An example of such adjustable mandrel is described in U.S. patent application Ser. No. 14/301,646 filed on Jun. 11, 2014. It will be understood that other implementations of the launch mode conditioner 216 and the receive mode filter 224 are possible. As known in the art, various manners of bending or inducing stress on an optical fiber may induce preferential attenuation of light.

It is envisaged that the optical power detector 206 used in the LSPM approach shown in FIGS. 2A-B can be a large-area optical power detector or a fiber-pigtailed optical power detector, depending on the application. In cases where a large-area optical power detector is used, controlling the modal distribution along the receive device 214 is allowed by the receive mode filter as shown in FIGS. 2A-B. Alternately, in cases where a fiber-pigtailed optical power detector is used, a pigtail fiber of the optical power detector 206 may be chosen to have a core diameter and a numerical aperture larger than that of the receive mode filter 224 such that there is no further mode filtering after the test light is propagated out of the receive device. Also, any modal distribution sensitivity of the fiber-pigtailed optical power detector may be overcome by incorporating a mode scrambler (not shown in FIGS. 2A-B) to the receive device 214 between the receive mode filter 224 and the fiber-pigtailed optical power detector 206. An example of a mode scrambler is a given portion of step-index multimode optical fiber.

During use, the optical source 204 is used to generate test light to be propagated into the multimode device link 212 so that the optical power detector 206 can detect an optical signal resulting from the propagation of the test light along the multimode device link 212 and transmit an output signal to the processor 230, which is representative of the value of the detected power. Upon reception of the output signal, the processor 230 is configured to determine an optical power attenuation value of the multimode DUT 50 based on the output signal. In the embodiment shown, the processor 230 is in communication with the optical power detector 206 via an output signal connection 232. The output signal connection 232 can be embodied in the form of a wired connection, a wireless connection or a combination thereof. The communication between the optical power detector 206 and the processor 230 can be direct or indirect (e.g. via a network such as the Internet). In another embodiment, the processor 230 is also in communication with the optical source 204 for controlling the test light injected into the multimode device link 212.

The system 200 can also include a computer-readable memory 234 connected to the processor 230. The computer-readable memory 234 may be employed to store one or more reference power values Pref or one or more other power values Pi that may be measured in the one-, two- and/or three-cord reference procedures.

In an embodiment, the computer readable memory 234 has a program stored thereon which can guide an end user through each step of the one-, two- or three-cord reference procedures. In this embodiment, the end user is guided by subsequent sets of instructions displayed on a display (not shown) of the system 200 to assist in referencing the system 200 and measuring the optical power attenuation value of the multimode DUT 50. For instance, an exemplary set of instructions can instruct the end user to connect the launch device 208 to the optical source 204, to connect the launch device 208 to the receive device 214 and to connect the receive device 214 to the optical power detector 206. The end user may interact with a GUI in order for the system 200 to confirm that the connection is suitably made. Then, the program may cause the optical source 204 to propagate test light along the launch device 208, thus allowing the optical power detector 206 to receive an optical signal and to transmit an output signal (that can be indicative of a reference power value Pref based on the detected optical signal) to the processor 230. The reference power value Pref can be stored on the computer-readable memory 234. The set of instructions can then instruct the end user to disconnect the launch device 208 from the optical power detector 206 and to connect the end 50a of the multimode DUT 50 to the launch device 208, to connect the end 50b of the multimode DUT 50 to an input end of the receive device 214 and the output end of the receive device 214 to the optical power detector 206. The set of instructions can display a GUI in order for the system 200 to confirm that the multimode DUT 50 is suitably connected. The program may cause the optical source 204 to propagate test light along the multimode device link 212 so connected, allowing the optical power detector 206 to detect an optical signal and to transmit an output signal (indicative of a first power value P1) to the processor 230. The first power value can be stored on the computer-readable memory 234. The processor 230 may be further configured to determine the optical power attenuation value of the multimode DUT 50 by subtracting the first power value P1 from the reference power value Pref. The program can display the measured optical power attenuation value. As it will be described hereinbelow, the program may cause the processor 230 to determine other optical power attenuation values which may be convenient, and determinable using the output signals.

Figure 4:
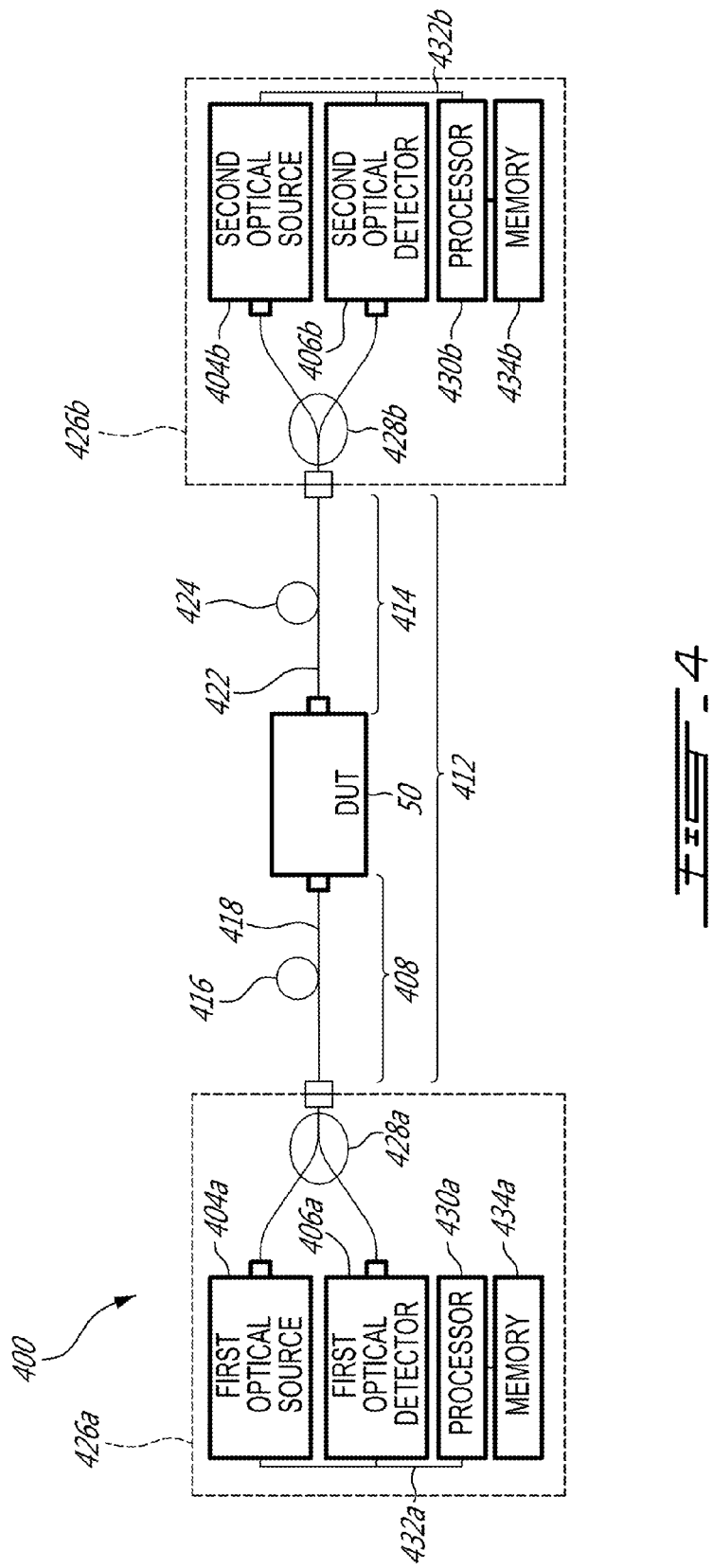
FIG. 4 is a schematic view of an example of a system for measuring an optical power attenuation value of a multimode DUT in a bi-directional optical loss test sets (OLTS) approach, exemplary of an embodiment.

It will also be understood that the measurement technique of FIGS. 2A-B may be extended to the case of a bi-directional LSPM approach employing two optical loss test sets (OLTS) each comprising an optical source and a fiber-pigtailed optical power detector. In this case, the optical power attenuation value may be measured bi-directionally without disconnecting and reconnecting the optical source and the optical power detector. As known in the art, OLTSs may also incorporate other functions such as Optical Return Loss (ORL) and fiber-length measurements. FIG. 4 is an example of a system 400 for measuring an optical power attenuation value of a multimode DUT 50 in accordance with a bi-directional OLTS approach. In this embodiment, the system 400 includes first and second OLTSs 426a and 426b each having a respective one of first and second optical sources 404a and 404b and a respective one of first and second fiber-pigtailed optical power detectors 406a and 406b (simply referred to as "optical power detectors 406a and 406b"). As depicted, the first and second OLTSs 426a and 426b are connected to opposite ends of a multimode device link 412. More specifically, the first and second optical sources 404a and 404b and first and second power detectors 406a and 406b of each of the first and second OLTS 426a and 426b are connectable to a respective one of the ends of the multimode device link 412 via optical couplers 428a and 428b.

During use, the multimode device link 412 has a first multimode device 408, the multimode DUT 50 and a second multimode device 414 serially connected to one another. The first multimode device 408 has a first mode conditioner 416 and a first multimode cord 418 and the second multimode device 414 has a second mode conditioner 424 along a second multimode cord 422. In this case, it is understood that the first multimode device 408 is symmetric to the second multimode device 414 relative to the multimode DUT 50 in the sense that, depending on which of the first and second optical sources 404a and 404b is used, the first multimode device 408 may be used as a launch device or as a receive device and the second multimode device 414 may be used as a launch device or as a receive device. Accordingly, the first multimode cord 408 may be a launch cord or a receive cord, and the second multimode cord 414 may be a launch cord or a receive cord depending on which of the first and second OLTSs 426a and 426b is used to propagate test light along the multimode device link 412. The first and the second mode filters of the first and second mode conditioners 416 and 424 are each configured to induce a preferential attenuation of high-order optical fiber modes of light (simply referred to as "preferential attenuation of light") propagating along the multimode device link 412. In an embodiment, the preferential attenuation of light is in compliance with the launch conditions requirements as defined in the IEC 61280-4-1 International Standard or in any other relevant Standard or recommendations. The first and second mode conditioners 416 and 424 can each be provided in the form of a portion of optical fiber wrapped around a circular mandrel having a diameter adapted for inducing the preferential attenuation of light.

As shown, each of the first and second OLTSs 426a and 426b has a respective one of a first and second processors 430a and 430b and a respective one of a first and second computer-readable memories 434a and 434b. Each of the first and second optical power detectors 406a and 406b is in communication with a respective one of the first and second processors 430a and 430b via output signal connections 432a and 432b. Each of the first and second optical power detectors 406a and 406b is configured to transmit an output signal to a corresponding one of the first and second processors 430a and 430b based on the detected optical signal upon detection of an optical signal resulting from the propagation of the test light along the multimode device link 412 using a corresponding one of the first and second optical power detectors 406a and 406b. Accordingly, Each of the first and second processors 430a and 430b is configured to determine an optical power attenuation value of the multimode DUT 50 based on the output signal.

As shown in FIG. 4, the first mode conditioner 416 and the first multimode cord 418 are part of a single continuous portion of waveguide (e.g. a continuous portion of a multi-mode optical fiber). The second multimode device 414 can also be provided in the form of a continuous portion of a multimode optical fiber. In the example provided in FIG. 4, any multimode optical fiber that is not specifically identified as a multimode step-index optical fiber (including that of the first mode conditioner 416, the first multimode cord 418, the second multimode cord 422 and the second mode conditioner 424) can be gradient-index multimode optical fibers.

In a further embodiment, the first mode conditioner 416 is provided inside the first OLTS 426a such that the first multimode device 408 is made only when the first multimode cord 418 is connected to the first OLTS 426a, or more specifically, to the first mode conditioner 416 that is provided inside the first OLTS 426a. In any case, the first multimode device 408 is said to incorporate the first mode conditioner 416 and the first multimode cord 418 during use of the system 400. Similarly, in an embodiment, the second mode conditioner 424 is provided inside the second OLTS 426b such that the second multimode device 414 is made only when the second multimode device 414 is connected to the second mode conditioner 424 that is provided inside the second OLTS 426b. The first and second multimode devices 408 and 414 can include one or more portions of a multimode optical fiber and one or more optical multimode components serially connected to one another. Such connection may be embodied by end connectors, a splice or any other suitable connection. For instance, the first mode conditioner 416 is connected to the first multimode cord 418 via an optical connection (e.g. a splice or end connectors). The second multimode cord 422 and the second mode conditioner 424 can also be connected via an optical connection.

In an embodiment, pigtail fibers of the first and second optical power detectors 406a and 406b may be chosen to have a core diameter and a numerical aperture larger than that of a corresponding one of the first and second mode conditioners 416 and 424 such that there is no further mode filtering after the test light is propagated out of a respective one of the first and second multimode device. Also, any modal distribution sensitivity of the fiber-pigtailed optical power detector may be overcome by incorporating one of first and second mode scramblers (not shown in FIG. 4) to a corresponding one of the first and second multimode devices 408 and 414, adjacent to a corresponding one of the first and second optical power detectors 406a and 406b. Accordingly, the first mode conditioner 416 includes a first mode filter and can include a first mode scrambler whereas the second mode conditioner 424 includes a second mode filter and can include a second mode scrambler. An example of a mode scrambler is a portion of step-index multimode optical fiber.

It is understood that the first and second multimode devices 408 and 414 are to be used in a manner similar than the conventional launch and receive cords 108 and 114 (shown in FIG. 1) in the conventional one-, two- and three-cord reference procedures. Accordingly, each of the first and second multimode devices 408 and 414 are configured to allow proper referencing.

During use, the first and second OLTSs 426a and 426b are used to generate test light to be propagated into the multimode device link 412 so that a corresponding one of the first and second optical power detectors 406a and 406b can detect an optical signal resulting from the propagation of the test light along the multimode device link 412 and transmit an output signal to one of the first and second processors 430a and 430b, representative of the value of the detected power. Upon reception of the output signal, the first and second processors 430a and 430b are configured to determine an optical power attenuation value of the multimode DUT 50 based on the output signal. In the embodiment shown, the first and second processors 430a and 430b are in communication with the first and second optical power detectors 406a and 406b via the output signal connections 432a and 432b. The output signal connections 432a and 432b can be embodied in the form of a wired connection, a wireless connection or a combination thereof. The communication between the optical power detectors and the processors or between the OLTSs can be direct or indirect (e.g. via a network such as the Internet).

Each of the first and second computer-readable memories 434a and 434b connected to a corresponding one of the first and second processors 430a and 430b. The computer-readable memories 434a and 434b may be employed to store one or more reference power values Pref or one or more other power values Pi that may be measured in the one-, two- and/or three-cord reference procedures. In an embodiment, each of the computer readable memories 434a and 434b has a program stored thereon which can guide an end user through each step of the one-, two- or three-cord reference procedures. In this embodiment, the end user is guided by subsequent sets of instructions displayed on a display (not shown) of the system 400 to assist in referencing the system 400 and measuring the optical power attenuation value of the multimode DUT 50. An example of such a set of instructions is described with reference to the system 200 shown in FIGS. 2A-B and can be used with the system 400.

Figure 5:
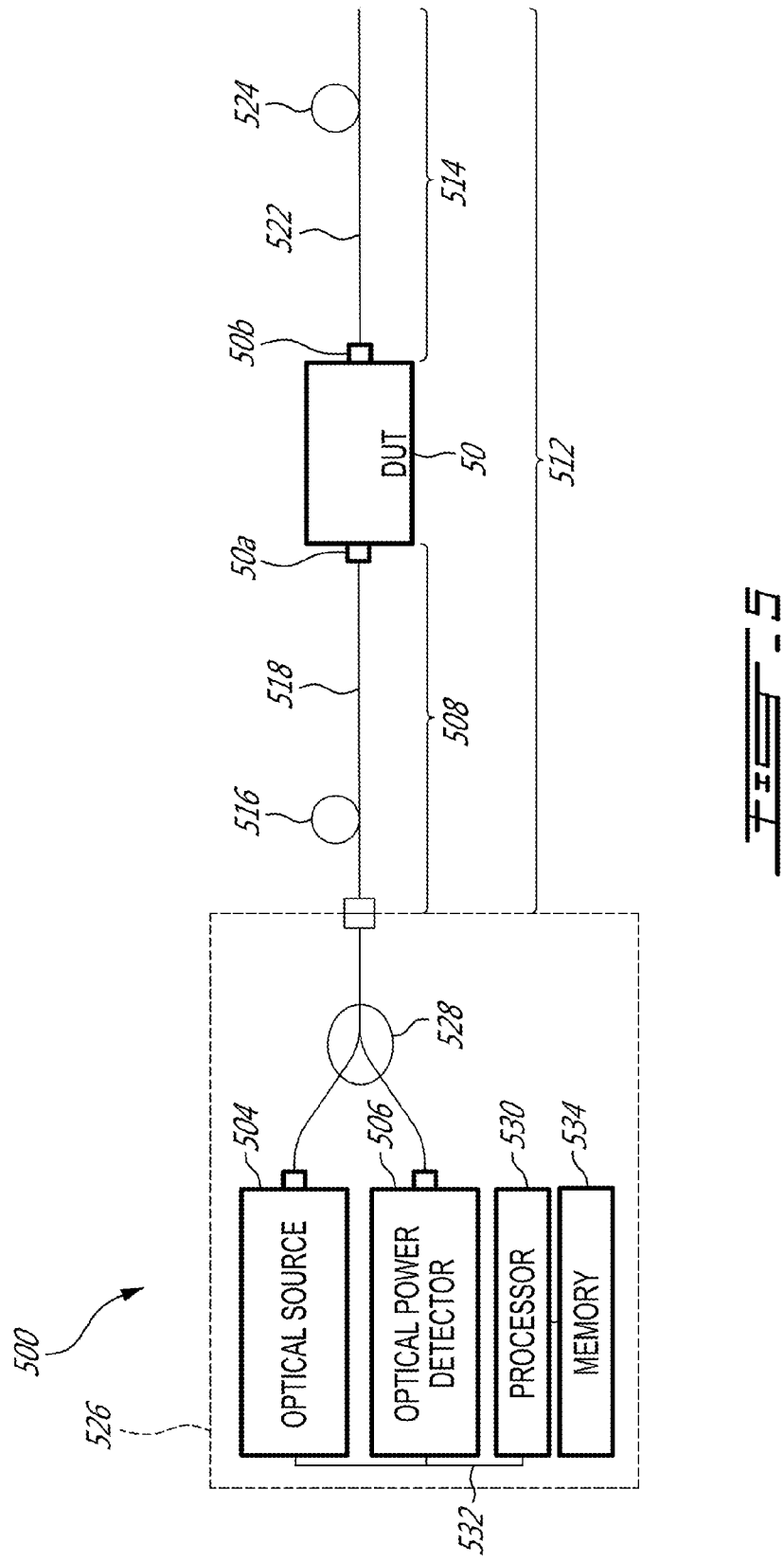
FIG. 5 is a schematic view of an example of a system for measuring an optical power attenuation value of a multimode DUT in an OTDR approach, exemplary of an embodiment.

It will be understood that the approach introduced with reference to FIGS. 2A-B may similarly be employed for measurement of optical power attenuation value using an Optical Time Domain Reflectometry (OTDR) approach. FIG. 5 shows an example of a system 500 for measuring an optical power attenuation value of a multimode DUT 50 using an OTDR 526, in accordance with the OTDR approach. In this embodiment, the OTDR 526 includes an optical source 504 and an optical power detector 506 connectable to a common end of a multimode device link 512 via an optical coupler 528, and a processor 530 in communication with at least the optical power detector 506. During use of the system 500, the multimode device link 512 includes a launch device 508, the multimode DUT 50, and a receive device 514 serially connected to one another.

Broadly described, the launch device 508 has a launch mode conditioner 516 and a launch cord 518, and the receive device 514 has a receive mode filter 524 along a receive cord 522. As depicted, the multimode DUT 50 has an end 50a connected to the launch cord 518 of the launch device 508 and an end 50b connected to the receive cord 522 of the receive device 514, leaving the launch and receive devices 508 and 514 at opposite ends of the multimode device link 512 during use of the system 500. The launch mode conditioner 516 of the launch device 508 and the receive mode filter 524 of the receive device 514 are each configured to induce a preferential attenuation of high-order optical fiber modes of light (simply referred to as "preferential attenuation of light") propagating along the multimode device link 512. In an embodiment, the preferential attenuation of light is in compliance with launch conditions requirements as defined in the IEC 61280-4-1 International Standard or in any other relevant Standard or recommendations. The launch mode conditioner 516 and the receive mode filter 524 can each be provided in the form of a portion of optical fiber wrapped around a circular mandrel having a diameter adapted for inducing the preferential attenuation of light.

The launch device 508 and the receive device 514 can include one or more portions of a multimode optical fiber and one or more optical multimode components serially connected to one another. As depicted in FIG. 5, the launch mode conditioner 516 and the launch cord 518 of the launch device 508 are part of a single continuous portion of waveguide (e.g. a continuous portion of a multimode optical fiber). The receive device 514 can also be provided in the form of a continuous portion of a multimode optical fiber. In the example provided in FIG. 5, any multimode optical fiber that is not specifically identified as a multimode step-index optical fiber (including that of the launch mode conditioner 516, the launch cord 518, the receive cord 522 and the receive mode filter 524) can be gradient-index multimode optical fibers.

In another embodiment, the launch mode conditioner 516 is provided inside the OTDR 526 such that the launch device 508 is made only when the launch cord 518 is connected to the optical source 504, or more specifically, to the launch mode conditioner 516 that is provided inside the OTDR 526. In any case, the launch device 508 is said to incorporate the launch mode conditioner 516 and the launch cord 518 during use of the system 500. In another embodiment, the launch mode conditioner 516 is connected to the launch cord 518 via an optical connection (e.g. a splice or end connectors). The receive cord 522 and the receive mode filter 524 can also be connected via an optical connection.

A pigtail fiber of the optical power detector 506 may be chosen to have a core diameter and a numerical aperture larger than that of the launch mode conditioner 516 such that there is no further mode filtering after the test light is propagated out of the launch device 508. Also, any modal distribution sensitivity of the fiber-pigtailed optical power detector may be overcome by incorporating a mode scrambler (not shown in FIG. 5) to a proximate end of the launch device 508. An example of such a mode scrambler is a given portion of step-index multimode optical fiber.

It is noted that the launch and receive devices 508 and 514 are to be used in a manner similar to the conventional launch and tail test cords employed in the conventional OTDR measurement as described in the IEC 61280-4-1 Standard. Accordingly, each of the launch and receive devices 508 and 514, respectively, are configured to allow proper referencing and the length of each of the launch and receive cords 518 and 522 is chosen to be longer than the respective dead zone created by the specific pulsewidth(s) employed for the OTDR measurement.

During use, the optical source 504 is used to generate test light to be propagated into the multimode device link 512 so that the optical power detector 506 can detect an optical signal including backscattering and reflected light resulting from the propagation of the test light along the multimode device link 512 and transmit an output signal to the processor 530, representative of the value of the detected power. Upon reception of the output signal, the processor 530 is configured to determine an optical power attenuation value of the multimode DUT 50 based on the output signal. In the embodiment shown, the processor 530 is in communication with the optical power detector 506 via an output signal connection 532. The output signal connection 532 can be embodied in the form of a wired connection, a wireless connection or a combination thereof. The communication between the optical power detector 506 and the processor 530 can be direct or indirect (e.g. via a network such as the Internet). In another embodiment, the processor 530 is also in communication with the optical source 504 for controlling the test light injected into the multimode device link 512.

The system 500 may also include a computer-readable memory 534 connected to the processor 530. The computer-readable memory 534 may be employed to store one or more reference power values or one or more other power values that may be measured in a reference procedure. In an embodiment, the computer readable memory 534 has a program stored thereon which can guide an end user through each step of the reference procedure. In this embodiment, the end user is guided by subsequent sets of instructions displayed on a display (not shown) of the system 500 to assist in referencing the system 500 and measuring the optical power attenuation value of the multimode DUT 50. An example of such a set of instructions is described with reference to the system 200 shown in FIGS. 2A-B and can be used also with the system 500 considering that the system 500 involves the OTDR approach instead of the LSPM approach.

As it will be noted, the optical power attenuation values measured using the conventional LSPM approach and the conventional OTDR approach (using a portion of multimode optical fiber as the receive device) on a same multimode DUT typically differ by a small bias. In fact, it can be shown that the optical power attenuation value measured with the conventional OTDR approach is typically lower than one measured with the conventional LSPM approach.

More specifically, the optical power attenuation value measured using the conventional OTDR approach is an average of contributions from both forwardly propagated light (referred to as "forward wave") and backwardly propagated light (referred to as "backward wave") whereas each direction of propagation of the waves has respective launching conditions. In other words, the modal distribution of the light launched forwardly into a multimode DUT differs from the modal distribution of light returning from the receive cord, backwardly into the multimode DUT. Consequently, the origin of the bias is due to three sources: forward wave mode filtration, overfilled backward attenuation, and filtered backward attenuation.

Indeed, the Rayleigh backscattering on a conventional receive device (consisting of a portion of multimode optical fiber) converts the forward wave to the backward wave gradually therealong, with a conversion factor specific for each of the modes. This conversion factor is higher for low order modes than for high order modes and thus filters the light in a manner that favors low order modes. For instance, if the launch conditions to the multimode DUT are mode conditioned (e.g. in compliance with the IEC 61280-4-1 international Standard): the forward attenuation obtained with the OTDR approach is generally less than the one measured with the LSPM approach in a case where the light coming out of the multimode DUT is underfilled (the typical case); the forward attenuation obtained with the OTDR approach is generally greater than the one measured with the LSPM approach in a case where the light coming out of the multimode DUT is overfilled; and there is no bias between the OTDR forward attenuation and the one measured with the LSPM approach when the light coming out of the multimode DUT is also mode conditioned. As for overfilled backward attenuation, it is noted that the backscattered light is always overfilled and is almost independent from the forward modes conditioning. Attenuation of the backward wave thus typically overestimates the optical power attenuation of the multimode DUT. In the most typical cases, the forward attenuation underestimates the optical power attenuation more strongly than the overestimation resulting from the backward attenuation, which results in a typically underestimated optical power attenuation value when using a conventional OTDR approach. Concerning filtered backward attenuation, it is noted that the backscattered light will have to go back through the launch device which can present an attenuation that is dependent on the modal distribution of the light coming out of the multimode DUT, thus the filtered backward attenuation also contributes to the bias.

Figure 6A:
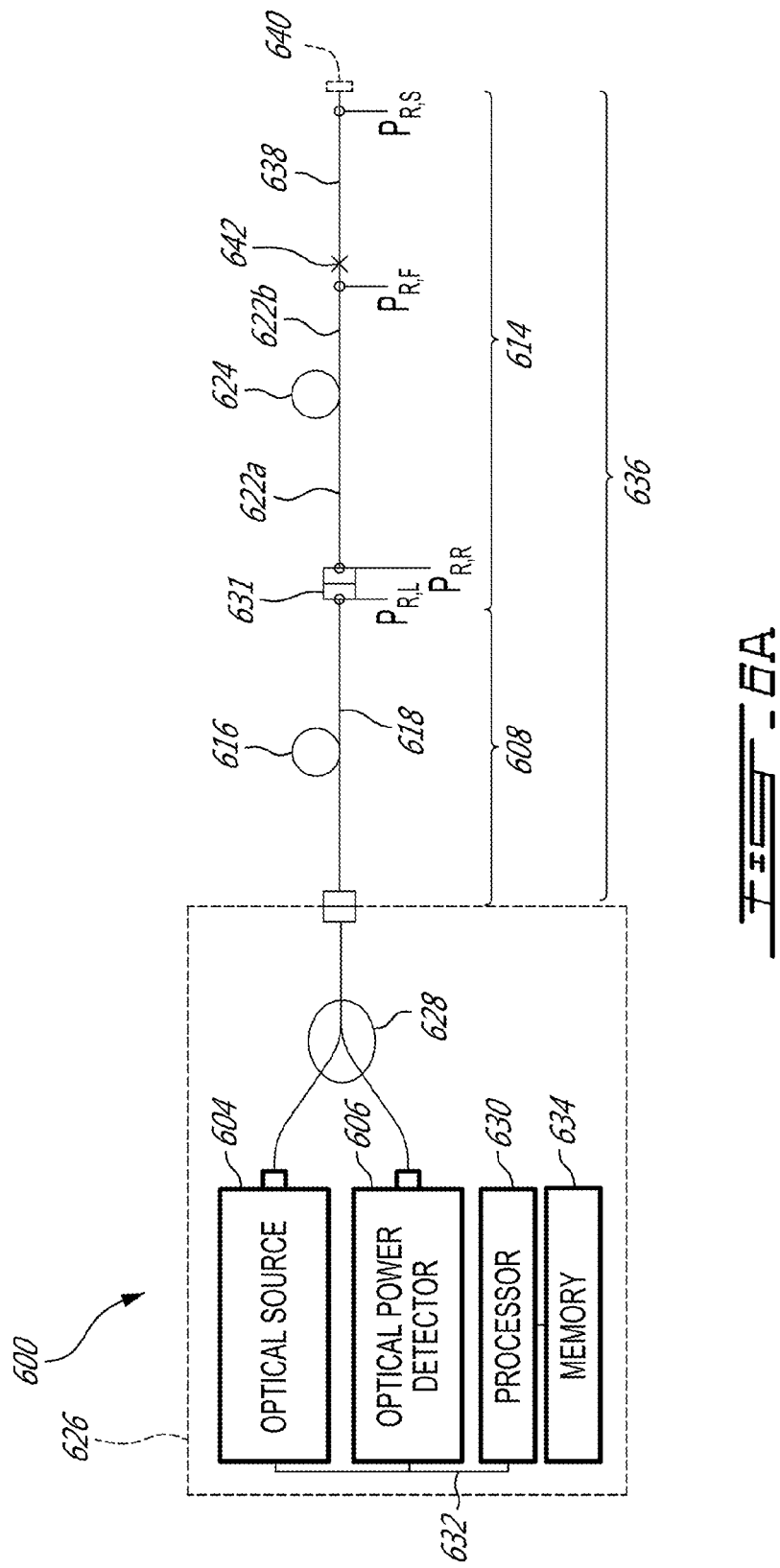
FIG. 6A is a schematic view of another example of a system for measuring an optical power attenuation value of a multimode DUT in an OTDR approach, shown in a referencing step.

Accordingly, FIGS. 6A-B show a system 600 based on an OTDR approach which has a receive device 614 for measuring an optical power attenuation value of a multimode device 50. The system 600 and its receive device 614 allows measurements equivalent to a conventional OTDR measurement, as well as measurements equivalent to an LSPM approach. In other words, use of the receive device 614 with the system 600 allows a processor 630 to determine both OTDR-like and LSPM-like optical power attenuation value measurements. The following paragraphs describe the receive device 614 and the computations in greater detail. FIG. 6A shows the system 600 in a prior referencing step and FIG. 6B shows the system 600 in a subsequent measuring step. For ease of understanding, FIG. 6C shows an example of an experimental OTDR reference trace 650 obtained in the referencing step illustrated in FIG. 6A whereas FIG. 6D shows an example of an experimental OTDR measurement trace 660 obtained in the measuring step shown in FIG. 6B.

As depicted in FIGS. 6A-B, the OTDR 626 includes an optical source 604 and an optical power detector 606 connectable to a proximate end of a reference link 636 via an optical coupler 628. The optical source 604 generates test light to be propagated along the multimode DUT, whereas the optical power detector 606 detects an optical signal including backscattering and reflected light resulting the propagation of the test light along the multimode DUT, to produce an output signal in the form of an OTDR trace representing the backscattering and reflected light level values as a function of distance along the link under test. As will be noticed by the skilled reader, each of the primed reference numerals shown in FIGS. 6C-D illustrates a backscattering power level associated with a respective one of the unprimed reference numerals shown in FIGS. 6A-B. For instance, the backscattering power level associated with the DUT 50 is shown in FIG. 6D at primed reference numeral 50'. The same applies for the other backscattering power levels 608', 614', 616', 618', 622a', 624', 622b', 631', 642', 638', 631a', 631b' and 641'.

The launch device 608 includes a launch mode conditioner 616 and a launch cord 618 and the receive device 614 has a first receive cord portion 622a, a receive mode filter 624, a second receive cord portion 622b and a light returning device 638 serially connected to one another. The light returning device 638 is a device configured to provide a backscattering conversion factor that is substantially independent of a modal distribution of light. In one embodiment, the conversion factor between the modes of the forward wave and the modes of the backward wave is independent of a modal distribution of the forward wave. In one embodiment, the light returning device 638 is embodied as a portion of a step-index fiber which provides sufficient backscattering to allow the OTDR 626 to perform an OTDR measurement. In another embodiment, the light returning device 638 is a portion of gradient-index fiber having a core diameter and/or a numerical aperture that is greater than that of the second receive cord portion 622b (e.g. a multimode fiber having a core diameter of 100 μm). The launch mode conditioner 616 of the launch device 608 and the receive mode filter 624 of the receive device 614 are each configured to induce a preferential attenuation of high-order optical fiber modes of light (simply referred to as "preferential attenuation of light") propagating therealong. In an embodiment, the preferential attenuation of light is in compliance with launch conditions requirements as defined in the IEC 61280-4-1 International Standard or in any other relevant Standard or recommendations. The launch mode conditioner 616 and the receive mode filter 624 may each be provided in the form of a portion of optical fiber wrapped around a circular mandrel having a diameter adapted for inducing the preferential attenuation of light. The light returning device 638 can further be used for distributing optical fiber modes of light being propagated along the receive device 614.

The launch device 608 and the receive device 614 may include one or more portions of a multimode optical fiber and one or more optical multimode components serially connected to one another. As depicted in FIGS. 6A-B, the launch mode conditioner 616 and the launch cord 618 of the launch device 608 are part of a single continuous portion of waveguide (e.g. a continuous portion of a multimode optical fiber). In another embodiment, the launch mode conditioner 616 is provided inside the OTDR 626 such that the launch device 608 is made only when the launch cord 618 is connected to the optical source 604, or more specifically, to the launch mode conditioner 616 that is provided inside the OTDR 626. In any case, the launch device 608 is said to incorporate the launch mode conditioner 616 and the launch cord 618 during use of the system 600. In another embodiment, the launch mode conditioner 616 is connected to the launch cord 618 via an optical connection (e.g. a splice or end connectors).

The first receive cord portion 622a, the receive mode filter 624, the second receive cord portion 622b of the receive device 614 are provided in the form of a continuous portion of a multimode optical fiber in the example shown in FIGS. 6A-B. However, it is understood that the first receive cord portion 622a, the receive mode filter 624, the second receive cord portion 622b can each be connected to one another via an optical connection (e.g. a splice or end connectors). The second receive cord portion 622b of the receive device 614 can be connected to the light returning device 638 via a splice 642, such as shown in FIGS. 6A-B. Any other optical connection may also be used.

In FIGS. 6A-B, any multimode optical fiber that is not specifically identified as a multimode step-index optical fiber (including that of the launch mode conditioner 616, the launch cord 618, the first and second receive cord portions 622a and 622b and the receive mode filter 624) may be gradient-index multimode optical fibers. In this embodiment, the light returning device 638 is a portion of step-index multimode optical fiber. In one embodiment, the step-index multimode optical fiber is terminated by an angle-polished or a non-angled polished surface. In another embodiment, the light returning device 638 comprises a distal end terminated with an optional reflective surface 640 (as shown in dashed line).

In another embodiment, a pigtail fiber of the optical power detector 606 may be chosen to have a core diameter and a numerical aperture larger than that of the launch mode conditioner 616 such that there is no further mode filtering after the test light is propagated out of the launch device 608. Also, any modal distribution sensitivity of the fiber-pigtailed optical power detector may be overcome by incorporating a mode scrambler (not shown in FIG. 6) to a proximate end of the launch device 608. An example of such a mode scrambler is a given portion of step-index multimode optical fiber.

It was found that by providing such a receive device 614, the overfilled backward attenuation and the forward attenuation mode filtering may be at least partially addressed concurrently. More specifically, the first receive cord portion 622a can be used to maintain a compatibility between conventional OTDR measurements as well as with the LSPM approach. The launch mode conditioner and the receive mode filter 616 and 624 can be used to control the modal distribution of the forward wave as well as to control the modal distribution of the backward wave so that the attenuation associated with the backward wave is not over-estimated anymore (compared with the conventional OTDR approach). The second receive cord 622b can be used to estimate the modal distribution of the light propagated out of the multimode DUT 50. Also, the light returning device 638 of the receive device 614 enables the measurement of an optical power attenuation value that is direction-independent and also equivalent to that measured with the LSPM approach.

For ease of understanding, the skilled reader will appreciate that the launch and receive devices 608 and 614 are to be used in a manner similar than the conventional launch and tail cords employed in the conventional OTDR measurement as described in the IEC 61280-4-1 Standard. Accordingly, each of the launch and receive devices 608 and 614, respectively, are configured to allow proper referencing and the length of each of the launch cord 618 and the first receive cord portion 622a is chosen to be longer than the respective dead zone created by the specific pulsewidth(s) employed for the OTDR measurement.

During use, the optical source 604 is used to generate test light to be propagated into the multimode device link 612 so that the optical power detector 606 can detect an optical signal including backscattering and reflected light resulting from the propagation of the test light along the multimode device link 612 and transmit an output signal to the processor 630, representative of the value of the detected power. Upon reception of the output signal, the processor 630 is configured to determine an optical power attenuation value of the multimode DUT 50 based on the output signal. In the embodiment shown, the processor 630 is in communication with the optical power detector 606 via an output signal connection 632. The output signal connection 632 can be embodied in the form of a wired connection, a wireless connection or a combination thereof. The communication between the optical power detector 606 and the processor 630 can be direct or indirect (e.g. via a network such as the Internet). In another embodiment, the processor 630 is also in communication with the optical source 604 for controlling the test light injected into the multimode device link 612.

The system 600 may also include a computer-readable memory 634 connected to the processor 630. The computer-readable memory 634 may be employed to store one or more reference power values or one or more other power values that may be measured in the reference procedure. In an embodiment, the computer readable memory 634 has a program stored thereon which can guide an end user through each step of the reference procedure. In this embodiment, the end user is guided by subsequent sets of instructions displayed on a display (not shown) of the system 600 to assist in referencing the system 600 and measuring the optical power attenuation value of the multimode DUT 50. Examples of exemplary instructions are described above.

During the referencing step, the reference link 636 has the launch device 608 serially connected to the receive device 614 via end connectors 631. When the reference link 636 is so connected to the OTDR 626, the OTDR 626 can be operated to measure reference power values associated with specific spatial locations along the reference link 636.

In this embodiment, the OTDR 626 is configured to measure reference backscattering power level values $P_{R,L}$, $P_{R,R}$, $P_{R,F}$ and $P_{R,S}$ such as shown along the launch and receive devices 608 and 614 in FIG. 6A and along the OTDR reference trace 650 shown in FIG. 6C. More specifically, reference launched backscattering power level value $P_{R,L}$ represents the backscattering power level measured at the distal end of the launch device 618, reference received backscattering power level value $P_{R,R}$ represents the backscattering power level measured at the proximate end of the receive device 614, reference filtered backscattering power level value $P_{R,F}$ represents the backscattering power level measured at the distal end of the second receive cord portion 622b of the receive device 614, and reference scrambler fiber backscattering power level value $P_{R,S}$ represents the backscattering power level measured at the distal end of the light returning device 638 of the receive device 614.

Once these reference backscattering power level values $P_{R,L}$, $P_{R,R}$, $P_{R,F}$ and $P_{R,S}$ are measured, the processor 630 can determine the following reference attenuation values using equations (1) to (4), which may be used in further steps for calculating the attenuation values characterizing the multimode DUT 50 and/or for performing some validations.

$$OPAV_{R,CON}=P_{R,L}-P_{R,R}; \tag{1}$$

$$OPAV_{R,MF}=P_{R,R}-P_{R,F}; \tag{2}$$

$$OPAV_{R,I}=P_{R,F}-P_{R,S}; \tag{3}$$

$$OPAV_{R,1\text{-}cord}=P_{R,L}-P_{R,S}-OPAV_{R,CON}-OPAV_{R,MF}; \tag{4}$$

The reference connection optical power attenuation value $OPAV_{R,CON}$ is the Optical Power Attenuation Value (OPAV) associated with the connection between the launch and receive devices 608 and 614. The reference link 636 may be validated by comparing the reference connection optical power attenuation value $OPAV_{R,CON}$ to a predetermined threshold. The reference link 636 may be held acceptable if $OPAV_{R,CON}$ is below the threshold value. Of course, if $OPAV_{R,CON}$ is greater than the threshold value, a warning may be displayed or otherwise output to the end user.

The reference mode filter optical power attenuation value $OPAV_{R,MF}$ is the attenuation mainly associated with the mode filter 624 of the receive device 614. Again, the reference link 636 may be validated by comparing $OPAV_{R,MF}$ to predetermined thresholds. The reference link 636 may be held acceptable if it is below a threshold value. A high value of $OPAV_{R,MF}$ (greater than the threshold value) can be indicative of an overfilled condition at the output of the launch cord 618, either due to bad connector and/or bad conditioning. Such modal distribution should not be acceptable and a warning to that effect may be displayed or otherwise output to the end user.

The reference interface optical power attenuation value $OPAV_{R,I}$ represents the power drop mainly associated with the interface of the second portion of gradient-index multimode optical fiber and the light returning device 638 of the receive device. Again, the reference link 636 may be validated by comparing $OPAV_{R,I}$ to predetermined thresholds. The reference link 636 may be held acceptable if it is below a threshold value. A high value of $OPAV_{R,I}$ (greater than the threshold value) can be indicative of an underfilled condition at the output of the launch cord 618 either due to bad connector and/or bad conditioning. Such modal distribution should not be acceptable and a warning to that effect may be displayed or otherwise output to the end user. It is understood that the spatial locations associated with the reference backscattering power level values $P_{R,L}$, $P_{R,R}$, $P_{R,F}$ and $P_{R,S}$ such as shown in FIG. 6A can vary. For instance, the reference scrambler fiber backscattering power level value $P_{R,S}$ can be associated with a proximate end of the light returning device 638 rather than a distal end of the light returning device 638. However, validation of the reference link 636 should consider the spatial locations associated with each of the reference backscattering power level values $P_{R,L}$, $P_{R,R}$, $P_{R,F}$ and $P_{R,S}$.

The 1-cord reference optical power attenuation value $OPAV_{R,1\text{-}cord}$ is the end-to-end attenuation reference value obtained by analogy to the 1-cord reference.

Throughout this document, power values, power ratios and equations are typically expressed in dBm and dB, respectively. However, one skilled in the art will understand that the power values, the power ratios and the equations can equivalently be expressed on a linear scale.

During the measuring step shown in FIG. 6B, the cord connection 631 of the reference link 636 is open to interconnect the multimode DUT 50 there along to form multimode device link 612. The multimode device link 612 has the launch device 608, the multimode DUT 50, and the receive device 614 serially connected to one another. When the multimode device link 612 is so connected to the OTDR 626, the OTDR 626 can be operated to measure power values associated with specific spatial locations along the multimode device link 612. In this embodiment, the OTDR 626 is configured to measure backscattering power level values $P_{M,L}$, $P_{M,R}$, $P_{M,F}$, $P_{M,S}$, $P_{M,DSTART}$ and $P_{M,DEND}$ such as shown along the multimode device link 612 in FIG. 6B and in the OTDR measurement trace 660 shown in FIG. 6D.

More specifically, measured launched backscattering power level value $P_{M,L}$ can represent the backscattering level measured at the distal end of the launch device 608, measured received backscattering power level value $P_{M,R}$ can represent the backscattering level measured at the proximate end of the receive device 614, measured filtered backscattering power level value $P_{M,F}$ can represent the backscattering level measured at a distal end of the second receive cord portion 622b of the receive device 614, measured scrambler fiber backscattering power level value $P_{M,S}$ can represent of the backscattering level measured at the distal end of the light returning device 638 of the receive device 614, measured proximate end of DUT backscattering power level value $P_{M,DSTART}$ can represent the backscattering level measured at the proximate end 50a of the multimode DUT 50, and measured end of DUT backscattering power level value $P_{M,DEND}$ can represent the backscattering level measured at the distal end 50b of the multimode DUT 50.

Once these backscattering power level values $P_{M,L}$, $P_{M,R}$, $P_{M,F}$, $P_{M,S}$, $P_{M,DSTART}$ and $P_{M,DEND}$ are measured, the processor 630 can determine the following optical power attenuation values using equations (6) to (9):

$$OPAV_{M,ConSTART} = P_{M,L} - P_{M,DSTART}; \quad (5)$$

$$OPAV_{M,ConEND} = P_{M,DEND} - P_{M,R}; \quad (6)$$

$$OPAV_{M,MF} = P_{M,R} - P_{M,F}; \quad (7)$$

$$OPAV_{M,I} = P_{M,F} - P_{M,S}; \quad (8)$$

$$OPAV_{M,1\text{-}cord} = P_{M,L} - P_{M,S}; \quad (9)$$

The measured first connector optical power attenuation value $OPAV_{M,conSTART}$ is the attenuation associated with a first cord connector 631a positioned at the proximate end 50a of the multimode DUT 50.

The measured second connector optical power attenuation value $OPAV_{M,conEND}$ is the attenuation associated with a second cord connector 631b positioned at the distal end 50b of the multimode DUT 50.

The measured mode filter optical power attenuation value $OPAV_{M,MF}$ is the attenuation mainly associated with the receive mode filter 624 of the receive device 614. As for the reference link above, the modal distribution of the test light may further be validated by comparing $OPAV_{M,MF}$ to predetermined thresholds. A high value of $OPAV_{M,MF}$ can be indicative of an overfilled condition at the output of the DUT.

The measured interface optical power attenuation value $OPAV_{M,I}$ represents the power drop mainly associated with the interface between the second receive cord portion 622b and the light returning device 638 of the receive device 614. The modal distribution may be further characterized using $OPAV_{M,I}$. A high value of $OPAV_{M,I}$ can be indicative of an underfilled condition at the output of the DUT. The $OPAV_{M,I}$ can be used to quantify an underfilled light condition.

The 1-cord measured optical power attenuation value $OPAV_{M,1\text{-}cord}$ is the raw attenuation of the multimode device link 612 obtained by analogy to the 1-cord reference:

Using the aforementioned power and optical power attenuation values, the processor 630 can determine one or more optical power attenuation values that may be desired by the end user with respect to equations (10a) and (10b):

$$OPAV_{NoDir,1\text{-}Cord} = OPAV_{M,1\text{-}Cord} - OPAV_{R,1\text{-}Cord} \quad (10a)$$

$$OPAV_{NoDir,2\text{-}Cord} = OPAV_{NoDir,1\text{-}Cord} - OPAV_{R,CON} \quad (10b)$$

The 1-cord direction-independent attenuation $OPAV_{NoDir,1\text{-}Cord}$ represents the attenuation of the multimode DUT 50, including the attenuation of both input and output connectors of the DUT 50, as obtained by analogy to 1-cord measurement. The 2-cord direction-independent attenuation $OPAV_{NoDir,2\text{-}Cord}$ represents the attenuation of the multimode DUT 50, including the attenuation of one connector of the DUT 50, as obtained by analogy to a 2-cord measurement. These values are advantageously independent of the direction in which the OTDR measurement is launched in the DUT 50.

Although $OPAV_{NoDir,1\text{-}Cord}$ and $OPAV_{NoDir,2\text{-}Cord}$ are likely to be the most useful parameters to characterize the DUT 50, the following parameters may be calculated and displayed or otherwise output to the end user, in order to provide a better transition from parameters obtained with conventional methods:

$$OPAV_{OTDR,1\text{-}Cord} = P_{M,L} - P_{M,R}; \quad (11)$$

$$OPAV_{LSPM,1\text{-}Cord} = OPAV_{NoDir,1\text{-}Cord} - \text{Corr}(OPAV_{M,MF}); \quad (12a)$$

$$OPAV_{LSPM,2\text{-}Cord} = OPAV_{NoDir,2\text{-}Cord} - \text{Corr}(OPAV_{M,MF}); \quad (12b)$$

where $\text{Corr}(OPAV_{M,MF}) \approx OPAV_{M,MF}$

The OTDR attenuation $OPAV_{OTDR,1\text{-}Cord}$ represents the attenuation of the multimode DUT 50 as would be conventionally measured using an OTDR, whereas the 1-cord LSPM attenuation $OPAV_{LSPM,1\text{-}Cord}$ and the 2-cord LSPM attenuation $OPAV_{LSPM,2\text{-}Cord}$ represent the attenuation of the multimode DUT 50 as would be conventionally measured with a LSPM approach using, respectively, a 1-cord and a 2-cord reference. Therefore, an end user accustomed to LSPM-like optical power attenuation values can obtain such LSPM-like values even when using the OTDR 626.

In practice, a suitable approximation of the correction value $\text{Corr}(OPAV_{M,MF})$ is the measured mode filter optical power attenuation value $OPAV_{M,MF}$. However, the correction value $\text{Corr}(OPAV_{M,MF})$ is actually a deterministic function of the measured mode filter optical power attenuation value $OPAV_{M,MF}$ which may be further determined, if held necessary, either by theory or calibration.

It should be noted that a bias induced on the OTDR measurement because of varying backscattering characteristics of the launch cord 618 and the first receive cord portion 622a may further be corrected for as described in Patent Application Publication US 2015/0198503 A1 to Leblanc et al. by conducting a bi-directional OTDR measurement at the referencing step.

In such an embodiment, the computer-readable memory 634 has recorded thereon instruction code for execution by the processor 630 for use with the OTDR 626. The instruction code can have code for obtaining an output signal based on an optical signal resulting from the propagation of test light along the multimode device link 612 including the launch device 608, the multimode DUT 50 and the receive device 614 serially connected to one another; code for processing the output signal to determine at least one optical power attenuation value of the multimode DUT 50 based on the output signal, wherein at least one of the at least one optical power attenuation value corresponding to an optical power attenuation value of the multimode DUT measured using the LSPM approach; and code for displaying the at least one optical power attenuation value of the multimode DUT 50. As it will be understood, the memory may have instruction code for computing and displaying any of the reference backscattering power level values, the measured backscattering power level values and the optical power attenuation values described above.

Figure 7:
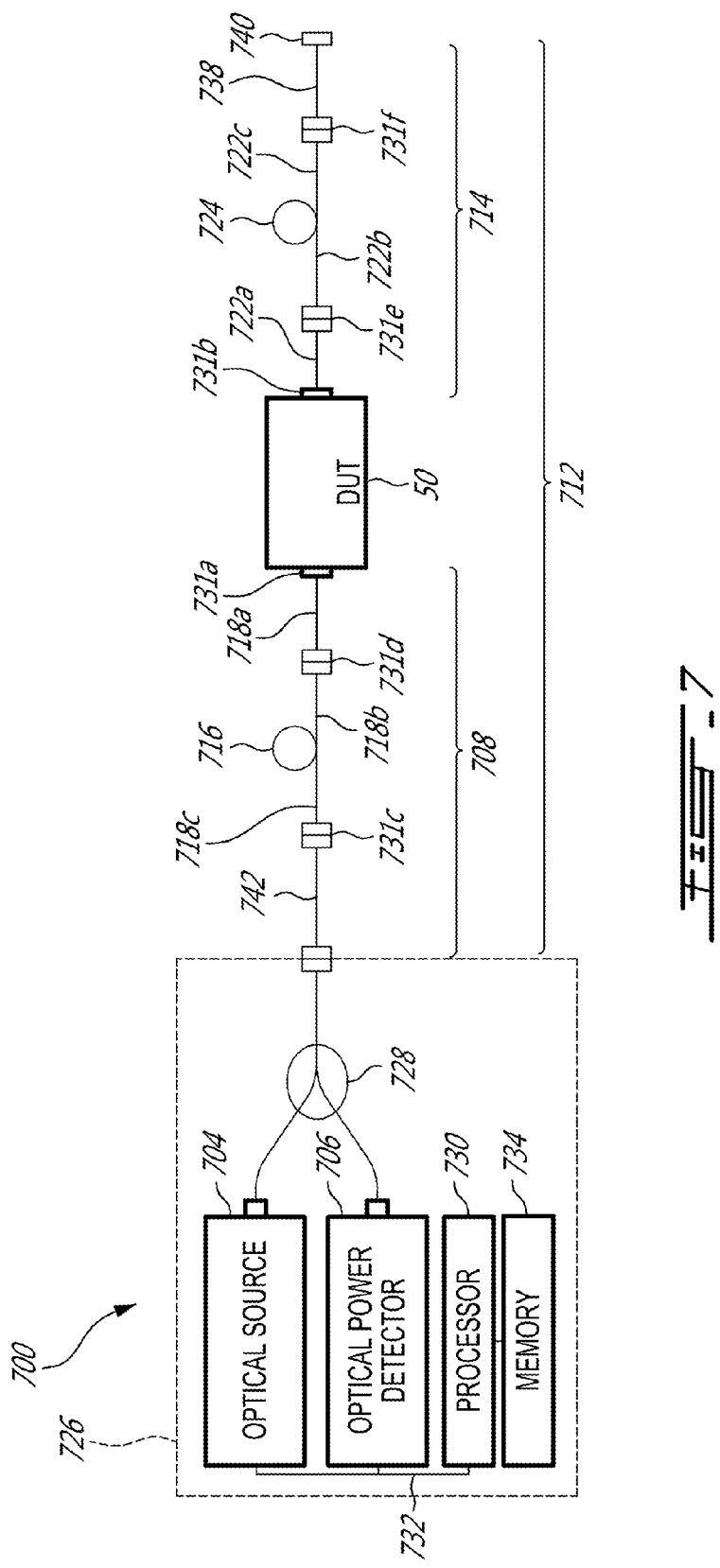
FIG. 7 is a schematic view of another example of a system for measuring an optical power attenuation value of a multimode DUT in an OTDR approach, shown with symmetrical launch and receive devices, exemplary of an embodiment.

FIG. 7 shows another example of a system 700 for measuring an optical power attenuation value of the multimode DUT 50 using an OTDR 726. Similarly to the embodiments shown in FIGS. 5-6B, the OTDR 726 shown in FIG. 7 has an optical source 704, an optical power detector 706, a processor 730 and an optional computer-readable memory 734. The optical source 704 and the optical power detector 706 are connectable to an end of a multimode device link 712 via an optical coupler 728. During use of the system 700, the multimode device link 712 has a launch device 708, the multimode DUT 50 and a receive device 714. In this example, the launch device 708 and the receive device 714 are connected to the DUT 50 via end connectors 731a and 731b.

As it appears from FIG. 7, the launch device 708 and the receive device 714 can be said to be symmetrical to one another. It will therefore be readily understood that the system 700 of FIG. 7 may be particularly useful for bidirectional OTDR measurements.

More specifically, the launch device 708 has a first launch cord portion 718a, a second launch cord portion 718b, a launch mode conditioner 716, a third launch cord portion 718c and a light returning device 742 serially connected to one another. In this embodiment, the launch light returning device 742 can also be used for distributing the optical modes of the backscattered and reflected light in order to overcome any modal distribution sensitivity that the optical power detector 706 of the OTDR 726 may have. As depicted, the third launch cord portion 718c, the launch mode conditioner 716 and the second launch cord portion 718b are part of a single continuous portion of waveguide (e.g. a continuous portion of a multimode optical fiber). The launch light returning device 742 is connected to the third launch cord portion 718c via first launch end connectors 731c. The second launch cord portion 718b is connected to the first launch cord portion 718c via second launch end connectors 731d. It is understood that a pigtail fiber of the OTDR 726 may be chosen to have a core diameter and a numerical aperture larger than that of the launch mode conditioner 716 such that there is no further mode filtering after the backscattering and reflected light is propagated out of the launch device 708.

In this illustrated example, the receive device 714 has a first receive cord portion 722a, a second receive cord portion 722b, a receive mode filter 724, a third receive cord portion 722c and a receive light returning device 738 serially connected to one another. The second receive cord portion 722b, the receive mode filter 724 and the third receive cord portion 722c are part of a single continuous portion of waveguide (e.g. a continuous portion of a multimode optical fiber). The first receive cord 722a is connected to the second receive cord portion 722b via first receive end connectors 731e. The third receive cord portion 722c is connected to the receive light returning device 738 via second receive end connectors 731f. In another embodiment, the receive light returning device 738 has a distal end terminated with an optional reflective surface 740.

When measuring an optical power attenuation value of the multimode DUT 50 using the system 700, the launch light returning device 742 is connected to the OTDR 726, the first launch cord portion 718a is connected to the multimode DUT 50, the first receive cord portion 722a is connected to the multimode DUT 50 and the receive light returning device 738 is located at a free end of the multimode device link 712. The end connectors 731c, 731d, 731e, and 731f facilitate replacement of any of the components of the launch and receive devices 708 and 714 when needed. For instance, during use, the first launch cord portion 718a and the first receive cord portion 722a will be repetitively connected and disconnected from a plurality of multimode DUTs 50 which may wear the end connectors 731a and 731b. When the end connectors 731a and 731b are assessed to be worn, the end connectors 731d and 731e allow replacement of the first launch and receive cord portions 718a and 722a without having to replace an entirety of the launch and receive devices 708 and 714. Additionally, when a given multimode DUT has end connectors that do not fit to the end connectors 731a and 731b of the first launch and receive cord portions 718a and 722a, the end connectors 731d and 731e allow substitution of the first launch and receive cord portions 718a and 722a for other first launch and receive cord portions which have end connectors that do fit with the end connectors of the given multimode DUT.

In this example, the launch mode conditioner 716 and the receive mode filter 724 are each provided in the form of a portion of a gradient-index optical fiber wrapped around a circular mandrel having a diameter adapted for inducing the preferential attenuation of light. For instance, the first launch and receive cord portions 718a and 722a are provided in the form of a gradient-index multimode optical fiber having a length of above 20 m, the second launch and receive cord portions 718b and 722b are provided in the form of a gradient-index multimode optical fiber having a length of about 6 m, the third launch and receive cord portions 718c and 722c are provided in the form of a gradient-index multimode optical fiber having a length of at least 20 m. In this example, the launch and receive light returning devices 742 and 738 are each provided in the form of a given length of step-index multimode optical fiber having a length of at least 20 m.

In another embodiment, the launch light returning device 742 and the launch mode conditioner 716 are provided inside the OTDR 726 such that the launch device 708 is made only when the first launch cord portion 718a is connected to the OTDR 726, or more specifically, to the second launch cord portion 718b that is provided inside the OTDR 726. In any case, the launch device 708 is said to incorporate the launch light returning device 742 and the launch mode conditioner 716 during use of the system 700.

It is noted that the launch and receive devices 708 and 714 are to be used in a manner similar than the conventional launch and tail cords employed in the conventional OTDR measurement as described in the IEC 61280-4-1 Standard. Accordingly, each of the launch and receive devices 708 and 714, respectively, are configured to allow proper referencing.

During use, the optical source 704 is used to generate test light to be propagated into a multimode device link 712 so that the optical power detector 706 can detect an optical signal including backscattering and reflected light resulting from the propagation of the test light along the multimode device link 712 and transmit an output signal to the processor 730, representative of the value of the detected power. The output signal can be used to display an OTDR trace (e.g. OTDR traces that resemble the OTDR traces 650 and 660 shown in FIGS. 6C-D). Upon reception of the output signal, the processor 730 is configured to determine an optical power attenuation value of the multimode DUT 50 based on the output signal. In the embodiment shown, the processor 730 is in communication with the optical power detector 706 via an output signal connection 732. The output signal connection 732 can be embodied in the form of a wired connection, a wireless connection or a combination thereof. The communication between the optical power detector 706 and the processor 730 can be direct or indirect (e.g. via a network such as the Internet). In another embodiment, the processor 730 is also in communication with the optical source 704 for controlling the test light injected into the multimode device link 712.

In an embodiment, the computer readable memory 734 has a program stored thereon which can guide an end user through each step of the two- or three-cord reference procedures. In this embodiment, the end user is guided by subsequent sets of instructions displayed on a display (not shown) of the OTDR 726 to assist in referencing the system 700 and measuring the optical power attenuation value of the multimode DUT 50. An example of such a set of instructions is described with reference to the system 600 shown in FIGS. 6A-B and can be used also with the system 700 considering that the system 700 involves the OTDR approach instead of the LSPM approach. As will be understood, determination of the optical power attenuation value of the multimode DUT 50 can involve measurements of backscattered power level values and calculations such as described above with reference to FIGS. 6A-B and equations (1) to (12b).

FIG. 8 shows another example of a system 800 for measuring an optical power attenuation value of the multimode DUT 50 using an OTDR 826. Similarly to the embodiments shown in FIGS. 5-7, the OTDR 826 shown in FIG. 8 has an optical source 804, an optical power detector 806, a processor 830 and an optional computer-readable memory 834. The optical source 804 and the optical power detector 806 are connectable to an end of a multimode device link 812 via an optical coupler 828.

During use of the system 800, the multimode device link 812 has a launch device 808, the multimode DUT 50 and a receive device 814. In this example, the launch device 808 and the receive device 814 are connected to the DUT 50 via end connectors 831a and 831b.

As depicted, the launch device 808 includes a launch mode conditioner 816 and a launch cord 818, and the receive device 814 has a first receive cord portion 822a, a receive mode filter 824, a second receive cord portion 822b and a light returning device 838 serially connected to one another.

In this embodiment, the light returning device 838 includes a portion of step-index multimode optical fiber 838a and a portion of gradient-index multimode optical fiber 838b serially connected to one another. As illustrated, the proximal end of the portion of step-index multimode optical fiber 838a is connected to the second receive cord portion 822b of the receive device 814 while the distal end of the portion of gradient-index multimode optical fiber 838b is terminated with an optional reflective surface 840 (as shown in dashed line).

As mentioned above, in some embodiments, the light returning device 638 of FIGS. 6A-B includes a portion of a step-index multimode optical fiber which provides sufficient backscattering to allow an OTDR to perform an OTDR measurement.

However, not all commercially available step-index multimode optical fibers can provide sufficient backscattering to allow an OTDR to perform an OTDR measurement. Indeed, it was found that some types of step-index multimode optical fiber recently made available on the market are optimized for reducing transmission losses and may not provide sufficient backscattering. For instance, one example of those types of step-index multimode optical fiber includes pure silica and doped cladding.

The light returning device 838 of FIG. 8 shows an example of a light returning device that can provide sufficient backscattering notwithstanding whether or not the step-index multimode optical fiber provides sufficient backscattering.

Indeed, in this embodiment, the portion of step-index multimode optical fiber 838a can be used for distributing optical fiber modes of light being propagated along the receive device 814. More specifically, the step-index multimode optical fiber 838a can distribute the optical fiber modes of light being propagated along the receive device 814, and the portion of gradient-index multimode optical fiber 838b can provide backscattering in a manner to allow the OTDR 826 to perform an OTDR measurement.

It was shown that a portion of step-index multimode optical fiber 838a having a length smaller than one meter, such as 30 cm of even a few centimeters, and a core diameter of 50 μm provides adequate distribution of the optical fiber modes. Similarly, a portion of gradient-index multimode optical fiber 838b having a length of 20 m and a core diameter of 62.5 μm was shown to provide sufficient backscattering not to limit the dynamic range of the OTDR 826. However, other lengths and core diameters may also apply.

As it will be understood, the light returning device 838 is shown as part of the receive device 814. However, a light returning device similar to the light returning device 838 can be provided as part of the launch device 808 in some other embodiments.

For instance, FIG. 9 shows another example of a system 900 for measuring an optical power attenuation value of the multimode DUT 50 using an OTDR 926. Similarly to the embodiments shown in FIGS. 5-8, the OTDR 926 shown in FIG. 9 has an optical source 904, an optical power detector 906, a processor 930 and an optical computer-readable memory 934. The optical source 904 and the optical power detector 906 are connectable to an end of a multimode device link 912 via an optical coupler 928.

During use of the system 900, the multimode device link 912 has a launch device 908, the multimode DUT 50 and a receive device 914. In this embodiment, the launch device 908 and the receive device 914 are connected to the DUT 50 via end connectors 931a and 931b.

More specifically, the launch device 908 has a first launch cord portion 918a, a second launch cord portion 918b, a launch mode conditioner 916, a third launch cord portion 918c and a launch light returning device 942 serially connected to one another. In this embodiment, the launch light returning device 942 can also be used for distributing the optical modes of the backscattered and reflected light in order to overcome any modal distribution sensitivity that the optical power detector 906 of the OTDR 926 may have. As depicted, the third launch cord portion 918c, the launch mode conditioner 916 and the second launch cord portion 918b are part of a single continuous portion of waveguide (e.g. a continuous portion of a multimode optical fiber). The launch light returning device 942 is connected to the third launch cord portion 918c via first launch end connectors 931c. The second launch cord portion 918b is connected to the first launch cord portion 918a via second launch end connectors 931d. It is understood that a pigtail fiber of the OTDR 926 may be chosen to have a core diameter and a numerical aperture larger than that of the launch mode conditioner 916 such that there is no further mode filtering after the backscattering and reflected light is propagated out of the launch device 908.

As depicted, the launch light returning device 942 has a portion of step-index multimode optical fiber 942a and a portion of gradient-index multimode optical fiber 942b serially connected to one another. As illustrated, the portion of step-index multimode optical fiber 942a is connected to the third launch cord portion 918c via first launch end connectors 931c, and the portion of gradient-index multimode optical fiber 942b is connected to the OTDR 926. The portion of step-index multimode optical fiber 942a can be used for distributing optical fiber modes of light being propagated along the launch device 908, and the portion of gradient-index multimode optical fiber 942b can provide backscattering in a manner to allow the OTDR 926 to perform an OTDR measurement.

In this illustrated example, the receive device 914 has a first receive cord portion 922a, a second receive cord portion 922b, a receive mode filter 924, a third receive cord portion 922c and a receive light returning device 938 serially connected to one another. The second receive cord portion 922b, the receive mode filter 924 and the third receive cord portion 922c are part of a single continuous portion of waveguide (e.g. a continuous portion of a multimode optical fiber). The first receive cord 922a is connected to the second receive cord portion 922b via first receive end connectors 931e. The third receive cord portion 922c is connected to the receive light returning device 938 via second receive end connectors 931f. In another embodiment, the receive light returning device 938 has a distal end terminated with an optional reflective surface 940.

As illustrated, the receive light returning device 938 is similar to the light returning device 838 of FIG. 8. Indeed, the receive light returning device 938 has a portion of step-index multimode optical fiber 938a and a portion of gradient-index multimode optical fiber 938b serially connected to one another. As shown, the portion of step-index multimode optical fiber 938a is connected to the third receive cord portion 922c via the second receive end connectors 931f. The portion of step-index multimode optical fiber 938a can be used for distributing optical fiber modes of light being propagated along the receive device 914, and the portion of gradient-index multimode optical fiber 938b can provide backscattering in a manner to allow the OTDR 926 to perform an OTDR measurement.

Each of the portions of step-index multimode optical fiber 938a and 942a can have a length smaller than one meter, such as 30 cm or even a few centimeters, and a core diameter of 50 µm provides adequate distribution of the optical fiber modes. Similarly, each of the portions of gradient-index multimode optical fiber 938b and 942b can have a length of 20 m and a core diameter of 62.5 µm to provide sufficient backscattering not to limit the dynamic range of the OTDR 926. However, other lengths and core diameters may also apply.

As can be understood, the examples described above and illustrated are intended to be exemplary only. The scope is indicated by the appended claims.

What is claimed is:

1. A method for measuring an optical power attenuation value of a multimode DUT, the method comprising:
    using an optical source, propagating test light along a multimode device link having a first multimode device, the multimode DUT and a second multimode device serially connected to one another;
    said propagating including inducing a preferential attenuation of high-order optical fiber modes of the test light along the first multimode device and along the second multimode device;
    using an optical power detector, detecting an optical signal resulting from the propagation of the test light along the multimode device link and transmitting an output signal based on the detected optical signal; and
    using a processor, determining the optical power attenuation value of the multimode DUT based on the output signal.

2. The method of claim 1 wherein said propagating is performed at an end of the multimode device link and wherein said detecting is performed at another end of the multimode device link.

3. The method of claim 1 wherein said propagating and said detecting are performed at a same end of the multimode device link.

4. The method of claim 3 wherein said propagating further includes scrambling the optical fiber modes of the test light along the second multimode device after said inducing the preferential attenuation along the second multimode device.

5. The method of claim 3 wherein said determined optical power attenuation value of the multimode DUT is equivalent to an optical attenuation power value of the multimode DUT as would be measured using a light-source power meter approach.

6. A system for measuring an optical power attenuation value of light being propagated along a multimode DUT, the system comprising:
    a first multimode device and a second multimode device having a respective one of a first mode conditioner and a mode filter each being configured to induce a preferential attenuation of high-order optical fiber modes of light;
    an optical source configured for generating test light to be propagated along a multimode device link including the first multimode device, the multimode DUT and the second multimode device serially connected to one another;
    an optical power detector connectable to the multimode device link configured for detecting an optical signal resulting from the propagation of the test light and for transmitting an output signal based on the detected optical signal; and a processor configured for determining the optical power attenuation value based on the output signal.

7. The system of claim 6 wherein the optical source and the optical power detector are both connectable to a same end of the multimode device link for use as an optical time-domain reflectometer, the detected optical signal comprising backscattering and reflected light resulting from the propagation of the test light along the multimode device link.

8. The system of claim 7 wherein the second multimode device further comprises a light returning device downstream from the mode filter of the second multimode device, the light returning device being configured to provide a backscattering conversion factor that is substantially independent of a modal distribution of light.

9. The system of claim 8 wherein the second multimode device further comprises a first portion of gradient-index multimode optical fiber upstream from the mode filter and a second portion of gradient-index multimode optical fiber downstream from the mode filter and upstream from the light returning device.

10. The system of claim 9 wherein the light returning device of the second multimode device comprises a portion of step-index multimode optical fiber.

11. The system of claim 10 wherein the light returning device of the second multimode device further comprises a third portion of gradient-index multimode optical fiber serially connected to the portion of step-index multimode optical fiber downstream thereof.

12. The system of claim 11 wherein the step-index multimode optical fiber has a length of less than one meter.

13. The system of claim 8 wherein the second multimode device has an end connectable to the multimode DUT and another end having a reflective surface.

14. The system of claim 6 wherein the optical source and the optical power detector are connectable at opposite ends of the multimode device link.

15. The system of claim 6 wherein the optical source and another optical power detector are connectable to one end of the multimode device link and wherein another optical source and the optical power detector are connectable to an opposite end of the multimode device link for performing optical power attenuation value measurements in both propagation directions along the multimode device link.

16. The system of claim 6 wherein the mode filter of the second multimode device includes a portion of multimode optical fiber wrapped about a mandrel having a diameter adapted for inducing the preferential attenuation.

17. A receive device for use in measuring an optical power attenuation value of a multimode DUT using a reflectometric method, the receive device comprising:
a first portion of gradient-index multimode optical fiber;
a mode filter having an end connected to the first portion of gradient-index multimode optical fiber, the mode filter inducing a preferential attenuation of high-order optical fiber modes of light being propagated along the mode filter;
a second portion of gradient-index multimode optical fiber connected to another end of the mode filter; and
a light returning device connected to the second portion of gradient-index multimode optical fiber configured to provide a backscattering conversion factor that is substantially independent of a modal distribution of light.

18. The receive device of claim 17 wherein the light returning device comprises a portion of step-index multimode optical fiber.

19. The receive device of claim 18 wherein the light returning device further comprises a third portion of gradient-index multimode optical fiber serially connected to the portion of step-index multimode optical fiber downstream thereof.

20. The receive device of claim 19 wherein the step-index multimode optical fiber has a length of less than one meter.

* * * * *